United States Patent
Wen et al.

(10) Patent No.: US 11,715,025 B2
(45) Date of Patent: Aug. 1, 2023

(54) METHOD FOR FORECASTING DISTRIBUTED RESOURCE UTILIZATION IN A VIRTUALIZATION ENVIRONMENT

(71) Applicant: Nutanix, Inc., San Jose, CA (US)

(72) Inventors: Jianjun Wen, San Jose, CA (US);
Abhinay Nagpal, San Jose, CA (US);
Himanshu Shukla, San Jose, CA (US);
Binny Sher Gill, San Jose, CA (US);
Cong Liu, Foster City, CA (US); Shuo Yang, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 647 days.

(21) Appl. No.: 15/394,654

(22) Filed: Dec. 29, 2016

(65) Prior Publication Data

US 2020/0027014 A1 Jan. 23, 2020

Related U.S. Application Data

(60) Provisional application No. 62/273,216, filed on Dec. 30, 2015.

(51) Int. Cl.
*G06N 7/01* (2023.01)
*G06N 5/02* (2023.01)

(52) U.S. Cl.
CPC ............... *G06N 7/01* (2023.01); *G06N 5/02* (2013.01)

(58) Field of Classification Search
CPC ................................ G06N 7/005; G06N 5/02
See application file for complete search history.

(56) References Cited

U.S. PATENT DOCUMENTS

| | | | |
|---|---|---|---|
| 7,953,843 B2 | 5/2011 | Cherkasova | |
| 8,060,599 B2 | 11/2011 | Cherkasova et al. | |
| 8,104,041 B2 | 1/2012 | Belady et al. | |
| 8,180,604 B2 | 5/2012 | Wood et al. | |

(Continued)

OTHER PUBLICATIONS

Wong et al., "BoostPred: An Automatic Demand Predictor for the Cloud," IEEE (2011) (Year: 2011).*

(Continued)

*Primary Examiner* — Ying Yu Chen
*Assistant Examiner* — Kevin L. Smith
(74) *Attorney, Agent, or Firm* — Vista IP Law Group, LLP

(57) ABSTRACT

A method for time series analysis of time-oriented usage data pertaining to computing resources of a computing system. A method embodiment commences upon collecting time series datasets, individual ones of the time series datasets comprising time-oriented usage data of a respective individual computing resource. A plurality of prediction models are trained using portions of time-oriented data. The trained models are evaluated to determine quantitative measures pertaining to predictive accuracy. One of the trained models is selected and then applied over another time series dataset of the individual resource to generate a plurality of individual resource usage predictions. The individual resource usage predictions are used to calculate seasonally-adjusted resource usage demand amounts over a future time period. The resource usage demand amounts are compared to availability of the resource to form a runway that refers to a future time period when the resource is predicted to be demanded to its capacity.

24 Claims, 16 Drawing Sheets

(56) References Cited

U.S. PATENT DOCUMENTS

| | | | |
|---|---|---|---|
| 8,291,411 B2 | 10/2012 | Beaty et al. | |
| 8,326,970 B2 | 12/2012 | Cherkasova et al. | |
| 8,379,538 B2 | 2/2013 | Rolia et al. | |
| 8,464,254 B1 | 6/2013 | Vohra et al. | |
| 8,533,222 B2 | 9/2013 | Breckenridge et al. | |
| 8,549,518 B1 | 10/2013 | Aron et al. | |
| 8,560,671 B1 | 10/2013 | Yahalom et al. | |
| 8,601,473 B1 | 12/2013 | Aron et al. | |
| 8,626,902 B2 | 1/2014 | Singh et al. | |
| 8,850,130 B1 | 9/2014 | Aron et al. | |
| 8,863,124 B1 | 10/2014 | Aron | |
| 8,997,097 B1 | 3/2015 | Aron et al. | |
| 9,015,122 B2 | 4/2015 | Harrison et al. | |
| 9,032,077 B1 | 5/2015 | Klein et al. | |
| 9,047,083 B2 | 6/2015 | Gupta et al. | |
| 9,052,936 B1 | 6/2015 | Aron et al. | |
| 9,083,581 B1 | 7/2015 | Addepalli et al. | |
| 9,152,643 B2 | 10/2015 | Whitehead et al. | |
| 9,154,589 B1 | 10/2015 | Klein et al. | |
| 9,210,100 B2 | 12/2015 | Der et al. | |
| 9,256,374 B1 | 2/2016 | Aron et al. | |
| 9,256,475 B1 | 2/2016 | Aron et al. | |
| 9,317,223 B2 | 4/2016 | Reohr et al. | |
| 9,336,031 B2 | 5/2016 | Hackett et al. | |
| 9,354,912 B1 | 5/2016 | Aron et al. | |
| 9,389,887 B1 | 7/2016 | Aron et al. | |
| 9,405,569 B2 | 8/2016 | Greden et al. | |
| 9,417,903 B2 | 8/2016 | Bello et al. | |
| 9,477,523 B1 | 10/2016 | Warman et al. | |
| 9,552,259 B1 | 1/2017 | Chopra et al. | |
| 9,563,697 B1 | 2/2017 | Caplan | |
| 9,575,784 B1 | 2/2017 | Aron et al. | |
| 9,595,054 B2 | 3/2017 | Jain et al. | |
| 9,619,257 B1 | 4/2017 | Aron et al. | |
| 9,619,261 B2 | 4/2017 | Gaurav et al. | |
| 9,626,275 B1 | 4/2017 | Hitchcock et al. | |
| 9,639,426 B2 | 5/2017 | Pawar et al. | |
| 9,641,385 B1 | 5/2017 | Daniel et al. | |
| 9,665,386 B2 | 5/2017 | Bayapuneni et al. | |
| 9,705,817 B2 | 7/2017 | Lui et al. | |
| 9,772,866 B1 | 9/2017 | Aron et al. | |
| 9,817,719 B2 | 11/2017 | Dain et al. | |
| 9,836,229 B2 | 12/2017 | D'sa et al. | |
| 9,842,153 B2 | 12/2017 | Bishop | |
| 9,882,969 B2 | 1/2018 | Reddy et al. | |
| 9,886,215 B1 | 2/2018 | Ramachandran et al. | |
| 9,933,979 B2 | 4/2018 | Gu et al. | |
| 9,959,188 B1 | 5/2018 | Krishnan | |
| 9,961,017 B2 | 5/2018 | Jacob et al. | |
| 10,067,722 B2 | 9/2018 | Lakshman | |
| 10,127,234 B1 | 11/2018 | Krishnan et al. | |
| 10,296,494 B2 | 5/2019 | Davis et al. | |
| 10,402,733 B1* | 9/2019 | Li | G06N 7/005 |
| 2004/0205206 A1 | 10/2004 | Naik et al. | |
| 2006/0010101 A1 | 1/2006 | Suzuki et al. | |
| 2006/0053262 A1 | 3/2006 | Prahlad et al. | |
| 2006/0218551 A1 | 9/2006 | Berstis et al. | |
| 2006/0224823 A1 | 10/2006 | Morley et al. | |
| 2006/0288346 A1 | 12/2006 | Santos et al. | |
| 2007/0136402 A1 | 6/2007 | Grose et al. | |
| 2008/0005468 A1 | 1/2008 | Faibish et al. | |
| 2008/0147934 A1 | 6/2008 | Nonaka et al. | |
| 2008/0295096 A1 | 11/2008 | Beaty et al. | |
| 2008/0320482 A1 | 12/2008 | Dawson et al. | |
| 2009/0030864 A1 | 1/2009 | Pednault et al. | |
| 2009/0287747 A1 | 11/2009 | Zane et al. | |
| 2009/0288084 A1 | 11/2009 | Astete et al. | |
| 2009/0319582 A1 | 12/2009 | Simek et al. | |
| 2010/0083248 A1 | 4/2010 | Wood et al. | |
| 2010/0121828 A1 | 5/2010 | Wang | |
| 2010/0217651 A1 | 8/2010 | Crabtree et al. | |
| 2010/0275058 A1 | 10/2010 | Hashimoto et al. | |
| 2011/0185355 A1 | 7/2011 | Chawla et al. | |
| 2011/0202657 A1 | 8/2011 | Chang et al. | |
| 2012/0041914 A1 | 2/2012 | Tirunagari | |
| 2012/0109619 A1 | 5/2012 | Gmach et al. | |
| 2012/0278275 A1* | 11/2012 | Danciu | G06Q 10/06 706/59 |
| 2013/0054910 A1 | 2/2013 | Vaghani et al. | |
| 2013/0080641 A1* | 3/2013 | Lui | H04L 43/045 709/226 |
| 2013/0086341 A1 | 4/2013 | Vasavi et al. | |
| 2013/0097377 A1* | 4/2013 | Satoyama | G06F 3/0685 711/E12.016 |
| 2013/0139152 A1* | 5/2013 | Chang | G06F 9/45545 718/1 |
| 2013/0174152 A1 | 7/2013 | Yu | |
| 2013/0185718 A1* | 7/2013 | S M | G06F 9/45558 718/1 |
| 2013/0283097 A1 | 10/2013 | Chen et al. | |
| 2014/0082614 A1 | 3/2014 | Klein et al. | |
| 2014/0157260 A1 | 6/2014 | Balani et al. | |
| 2014/0237477 A1 | 8/2014 | Cadambi et al. | |
| 2014/0279784 A1 | 9/2014 | Casalaina et al. | |
| 2014/0282525 A1 | 9/2014 | Sapuram et al. | |
| 2014/0289268 A1* | 9/2014 | Patil | G06F 16/9535 707/765 |
| 2014/0289733 A1 | 9/2014 | Fritz et al. | |
| 2014/0344453 A1 | 11/2014 | Varney et al. | |
| 2015/0033224 A1* | 1/2015 | Maheshwari | G06F 3/067 718/1 |
| 2015/0106578 A1 | 4/2015 | Warfield et al. | |
| 2015/0169291 A1 | 6/2015 | Dube et al. | |
| 2015/0215173 A1 | 7/2015 | Dutta et al. | |
| 2015/0234869 A1 | 8/2015 | Chan et al. | |
| 2015/0286507 A1* | 10/2015 | Elmroth | G06F 9/5061 718/104 |
| 2015/0339572 A1* | 11/2015 | Achin | G06N 5/02 706/46 |
| 2015/0341223 A1 | 11/2015 | Shen et al. | |
| 2015/0350102 A1 | 12/2015 | Leon-Garcia et al. | |
| 2015/0379429 A1 | 12/2015 | Lee et al. | |
| 2016/0019094 A1 | 1/2016 | Habdank et al. | |
| 2016/0048337 A1 | 2/2016 | Prahlad et al. | |
| 2016/0048408 A1 | 2/2016 | Madhu et al. | |
| 2016/0203176 A1 | 7/2016 | Mills | |
| 2016/0224384 A1 | 8/2016 | Gokhale et al. | |
| 2016/0232450 A1 | 8/2016 | Chen et al. | |
| 2016/0300142 A1 | 10/2016 | Feller et al. | |
| 2016/0359955 A1 | 12/2016 | Gill et al. | |
| 2016/0364647 A1 | 12/2016 | Achin et al. | |
| 2016/0371181 A1* | 12/2016 | Garvey | G06F 12/0253 |
| 2016/0373377 A1 | 12/2016 | Cao et al. | |
| 2016/0379125 A1 | 12/2016 | Bordawekar et al. | |
| 2017/0031816 A1 | 2/2017 | Lee et al. | |
| 2017/0093639 A1* | 3/2017 | Dabbagh | H04L 41/12 |
| 2017/0262520 A1 | 9/2017 | Mitkar et al. | |
| 2017/0339069 A1* | 11/2017 | Larsson | H04L 47/823 |
| 2017/0364307 A1 | 12/2017 | Lomelino et al. | |
| 2017/0364387 A1 | 12/2017 | Ahmed et al. | |
| 2018/0046487 A1 | 2/2018 | Matters et al. | |
| 2018/0060134 A1 | 3/2018 | Bianchini et al. | |
| 2018/0225139 A1 | 8/2018 | Hahn et al. | |
| 2019/0146707 A1 | 5/2019 | Fetik | |

OTHER PUBLICATIONS

Molina et al., "Addressing Memory Exhaustion Failures in Virtual Machines in a Cloud Environment," IEEE (2013) (Year: 2013).*

Nagpal et al., "Stay-Fit: Seasonal Time series Analysis and Forecasting using Tournament Selection", 3 pages; Nutanix, Inc., San Jose, CA. USA.

Dlessner, "Stay-Fit: Getting Ready for What Is Next in Prism", Nutanix, Inc., Dec. 8, 2015, 4 pages.

[Nutanix-049] U.S. Appl. No. 15/006,435, filed Jan. 26, 2016, 65 pages.

[Nutanix-053] U.S. Appl. No. 15/173,577, filed Jun. 3, 2016, 102 pages.

[Nutanix-081] U.S. Appl. No. 15/191,387, filed Jun. 23, 2016, 59 pages.

Non-Final Office Action dated Mar. 22, 2018 for related U.S. Appl. No. 15/191,387.

(56) References Cited

OTHER PUBLICATIONS

Wikipedia. "Feasible region". Nov. 16, 2015. 2 pages.
"What Is Multi objective Optimization?" Feb. 16, 2015. 1 page. http://www.mathworks.com/help/gads/what-is-multiobjective-optimization.html.
Caramia et al. "Multi-objective Optimization". 2008. 27 pages. Chapter 2. Springer-Verlag London.
Wikipedia. "Gittins index". Dec. 7, 2015. 6 pages.
Pandelis et al. "On the optimality of the Gittins index rule for multi-armed bandits with multiple plays". Jul. 1999. 13 pages.
Deel et al. "Linear Tape File System (LTFS) Format Specification". Dec. 21, 2013. 69 pages.
Non-Final Office Action dated Nov. 14, 2017 for related U.S. Appl. No. 15/186,235.
Non-Final Office Action dated Nov. 27, 2017 for related U.S. Appl. No. 15/160,246.
Final Office Action dated Mar. 30, 2018 for related U.S. Appl. No. 15/160,246.
Notice of Allowance dated May 16, 2018 for related U.S. Appl. No. 15/186,235.
Non-Final Office Action dated May 24, 2018 for related U.S. Appl. No. 15/351,388.
Non-Final Office Action dated Jun. 8, 2018 for related U.S. Appl. No. 15/298,149.
Non-Final Office Action dated Jun. 29, 2018 for related U.S. Appl. No. 15/352,495.
Mei et al., Performance Analysis of Network I/O Workload in Virtualized Data Centers, 2010, IEEE, pp. 1-16 (Year: 2010).
Paul et al., Performance Monitoring and Capacity Planning, 2006, VMWorld, pp. 1-39 Centers (Year: 2006).
Notice of Allowance dated Aug. 15, 2018 for related U.S. Appl. No. 15/160,246.
Final Office Action dated Aug. 15, 2018 for related U.S. Appl. No. 15/191,387.
U.S. Appl. No. 15/298,107, filed Oct. 19, 2016, 57 pages.
U.S. Appl. No. 15/341,549, filed Nov. 2, 2016, 90 pages.
U.S. Appl. No. 15/006,416, filed Jan. 26, 2016, 64 pages.
Non-Final Office Action dated Sep. 6, 2018 for related U.S. Appl. No. 15/283,004, 5 pages.
Notice of Allowance dated Oct. 18, 2018 for related U.S. Appl. No. 15/298,149, 5 pages.
Advisory Action dated Nov. 1, 2018 for related U.S. Appl. No. 15/191,387, 3 pages.
Final Office Action dated Nov. 16, 2018 for related U.S. Appl. No. 15/351,388, 19 pages.
Notice of Allowance dated Dec. 31, 2018 for related U.S. Appl. No. 15/191,387, 8 pages.
Final Office Action dated Feb. 15, 2019 for related U.S. Appl. No. 15/352,495, 22 pages.
Notice of Allowance dated Feb. 21, 2019 for related U.S. Appl. No. 15/283,004, 5 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Apr. 29, 2019 for U.S. Appl. No. 15/298,149, 10 pages.
Notice of Allowance dated Aug. 7, 2019 for related U.S. Appl. No. 15/283,004.
Final Office Action dated Aug. 16, 2019 for U.S. Appl. No. 15/298,149.
Notice of Allowance dated May 22, 2019 for U.S. Appl. No. 15/191,387.
Non-Final Office Action dated May 24, 2019 for related U.S. Appl. No. 15/251,244.
Notice of Allowance dated Jun. 5, 2019 for related U.S. Appl. No. 15/283,004.
Non-Final Office Action dated Jun. 6, 2019 for related U.S. Appl. No. 15/181,094.
Advisory Action dated Oct. 30, 2019 for U.S. Appl. No. 15/298,149.
Final Office Action dated Jan. 7, 2020 for related U.S. Appl. No. 15/251,244.
Final Office Action dated Jan. 27, 2020 for related U.S. Appl. No. 15/181,094.
Notice of Allowance dated Feb. 13, 2020 for U.S. Appl. No. 15/298,149.
Non-Final Office Action dated May 4, 2020 U.S. Appl. No. 16/237,450.
Notice of Allowance dated May 28, 2020 for related U.S. Appl. No. 15/181,094.
Supplemental Notice of Allowability dated Jul. 17, 2020 for related U.S. Appl. No. 15/181,094.
Final Office Action dated Aug. 19, 2020 U.S. Appl. No. 16/237,450.
Non-Final Office Action dated May 27, 2021 U.S. Appl. No. 16/237,450.
Final Office Action dated Sep. 9, 2021 U.S. Appl. No. 16/237,450.
Davis, D., "David Davis on vCenter Operations—Post #15—Storage Capacity Analysis," VMWare Cloud Management, dated Sep. 9, 2014.
Notice of Allowance for U.S. Appl. No. 16/237,450 dated Feb. 3, 2022.
Notice of Allowance for U.S. Appl. No. 16/237,450 dated Jun. 2, 2022.
Notice of Allowance for U.S. Appl. No. 16/237,450 dated Oct. 13, 2022.
Poitras, Steven. "The Nutanix Bible" (Sep. 9, 2022), from https://nutanixbible.com/(Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

* cited by examiner

METHOD FOR FORECASTING DISTRIBUTED RESOURCE UTILIZATION IN A VIRTUALIZATION ENVIRONMENT

CROSS REFERENCE TO RELATED APPLICATIONS

The present application claims the benefit of priority to U.S. Provisional Patent Application Ser. No. 62/273,216 titled, "METHOD FOR FORECASTING DISTRIBUTED RESOURCE UTILIZATION IN A VIRTUALIZATION ENVIRONMENT", filed Dec. 30, 2015, which is hereby incorporated by reference in its entirety.

FIELD

This disclosure concerns a method for forecasting resource utilization in a virtualization environment.

BACKGROUND

The cost of purchasing and maintaining servers and technological equipment can represent a significant drain on the resources of a company and substantially affect their bottom line. Furthermore, for companies that are in the business of providing computing as a service, the difference between a well-managed computing infrastructure and a poorly managed computing infrastructure can equal the difference between a profitable enterprise and a failed enterprise.

Unfortunately, given the size and complexity of modern systems, it is difficult for an individual to determine the best actions to take to maintain a system at a target level using only intuition, anecdotes, and ad hoc experiences.

For example, traditional methods of estimating disk space utilization of a storage pool generate predictions based on the system as a whole. That is, they identify the total amount of available disk space, and then generate predictions based on the total utilization of that space. These predictions are based on a single representative usage pattern. However, in multi-user computing environments, distributed resources of the cluster (e.g., disk capacity as a whole) areas are used by multiple users, and each individual user may have their own individual usage pattern.

Traditional techniques fail to account for the variance of usage patterns among the individual users and individual nodes. For example, in the area of distributed storage, thickly provisioned disks and reservations appear at the level of the storage pool as pre-provisioned "to be used" space. Therefore, when viewed at the level of the storage pool this will likely inject over-provisioning error into the prediction, because instead of capturing the actual usage of the thickly provisioned disk or reservation, it captures the larger thickly provisioned disk or reservation itself. Furthermore, because the cluster level prediction is based on aggregated data, legacy techniques fail to account for the differences in usage patterns of the individual users or nodes.

Furthermore, while there are several available time series analysis models, each particular model has its own particular strengths and weaknesses and may not provide good predictions under many data-specific circumstances. Despite this, traditional methods generate their predictions based on the total or aggregate usage data, and therein select a single time series analysis model regardless of whether the underlying data would be more accurately predicted by separately-determined models.

The problems of current techniques are further exacerbated by the sheer magnitude of data collected, the amount of data to be analyzed, and by the dynamic nature of the data. This causes the historical techniques to be less accurate and less capable of addressing the ever-increasing desire for ever-more accurate analysis.

Therefore, what is needed is a method for forecasting distributed resource utilization in a virtualization environment that provides more accurate forecasting.

BRIEF DESCRIPTION OF THE DRAWINGS

The drawings described below are for illustration purposes only. The drawings illustrate the design and utility of embodiments of the present invention, in which similar elements are referred to by common reference numerals. In order to better appreciate the advantages and objects of embodiments of the invention, reference should be made to the accompanying drawings. The drawings are not intended to limit the scope of the present disclosure.

DETAILED DESCRIPTION OF THE EMBODIMENTS OF THE INVENTION

Figure 1A:
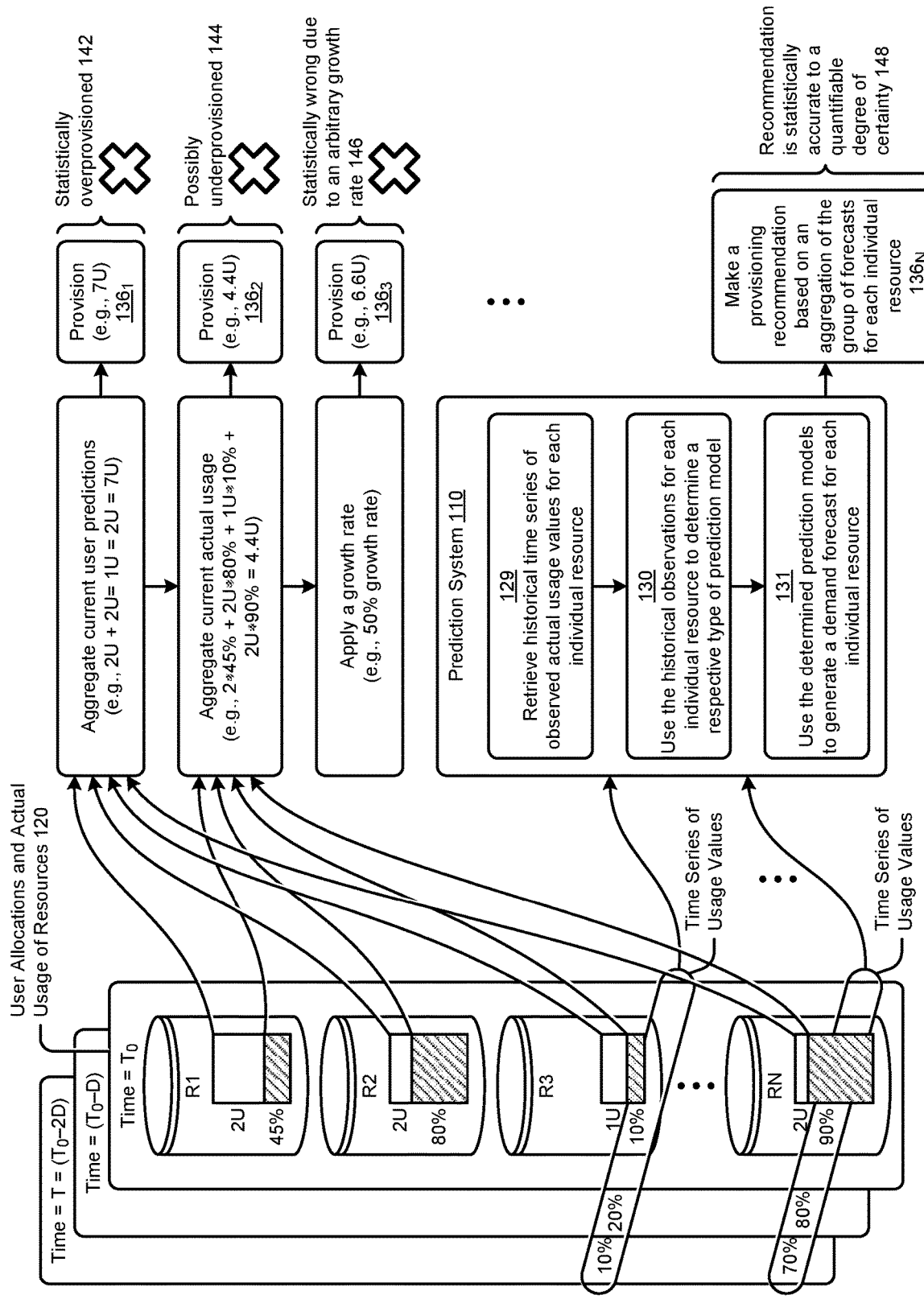
FIG. 1A illustrates use of a time series of resource usage values for making provisioning recommendations in accordance with some embodiments.

The present disclosure provides a method for forecasting distributed resource utilization in a virtualization environment.

Time series analysis refers to the process of analyzing time series data to extract meaningful statistics and characteristics from the data. The models are a framework for mathematically representing future values using previous values, where examples of such models include at least, autoregressive models, integrated models, moving average models, and various combinations with each having its own respective strengths and weaknesses. For instance, popular models include the autoregressive integrated moving average (ARIMA) models, exponential smooth (ETS) models, seasonal trend decomposition using Loess (STL) models, neural network-based models, random walk models, seasonal naïve models, mean models, and linear regression with seasonal component models, among others.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment.

The disclosure provides the various processes for forecasting distributed resource utilization in a virtualization environment. To illustrate the embodiments of the invention, various embodiments will be described in the context of a virtualization environment. It is noted, however, that the invention is applicable to other types of systems as well, and is therefore not limited to virtualization environments unless explicitly claimed as such.

By way of background, a "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer. Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine becomes completely compatible with most standard operating systems, applications, and device drivers. Most modern implementations allow several operating systems and applications to safely run at the same time on a single computer, with each having access to the resources it needs when it needs them.

Virtualization facilitates having multiple virtual machines run on a single physical machine, with each virtual machine sharing the resources of that one physical computer across multiple environments. Different virtual machines can run different operating systems and multiple applications on the same physical computer. One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not used to perform useful work. This is wasteful and inefficient if there are users on other physical machines which are currently waiting for use of (e.g., allocation) or access to a computing resource. To address this problem, virtualization facilitates sharing such that multiple VMs share the underlying physical resources so that during periods of inactivity by one VM, other VMs can take advantage of the resource availability to process workloads. This can produce great efficiencies for the utilization of physical devices, and can result in reduced redundancies and better resource cost management.

Virtualization systems have now become a relatively common type of technology used in many company and organizational data centers, with ever increasing and advanced capabilities being provided for users of the system. However, the ability of users to manage these virtualizations systems have thus far not kept up with the rapid advances made to the underlying systems themselves.

As noted above, one area where this issue is particularly noticeable and problematic is with respect to the desire to more efficiently provision and manage these systems. Therefore, what is described herein is a process for forecasting distributed resource utilization in a virtualization environment.

The drawings described below are for illustration purposes only. The drawings are not intended to limit the scope of the present disclosure.

FIG. 1A illustrates use of a time series of resource usage values for making provisioning recommendations. As shown, a series of user allocations of resources (e.g., R1, R2, . . . , RN) include usage indications. The usage indications can be expressed in any units. For example, in a storage area scenario, a unit might refer to a terabyte of storage, thus a usage indication of "2U" might refer to two terabytes of storage. Any of these user allocations can be collected into a collection of measurements of actual usage of resources 120.

In many computing environments, distributed resources of the cluster are used by multiple resource users, and each individual resource user may have their own individual usage pattern. As used herein a user or resource user can refer to a user account, or to a virtual machine, or to an executable container, or to a logical grouping of resource users such as an enterprise department or division, etc.

In one provisioning technique, a set of current user predictions are summed to form a quantitative provisioning value (at $136_1$). This technique often results in values that are statistically overprovisioned 142.

In another provisioning technique, a set of current user actual uses are summed to form a quantitative provisioning value (at $136_2$). This technique often results in values that are possibly underprovisioned 144.

In yet another provisioning technique, a set of current user actual uses are summed to form a quantitative provisioning value, which value is multiplied by a growth factor (at $136_3$). This technique often results in values that are statistically wrong do the application of an arbitrary growth rate 146.

Another approach is implemented by prediction system 110 that retrieves a time series (at step 129), uses historical observations to determine an applicable prediction model (as step 130) and uses the prediction model to recommend and forecast (at step 131). The desired result is a recommendation that is statistically accurate to a quantifiable degree of certainty 148.

Figure 1B:
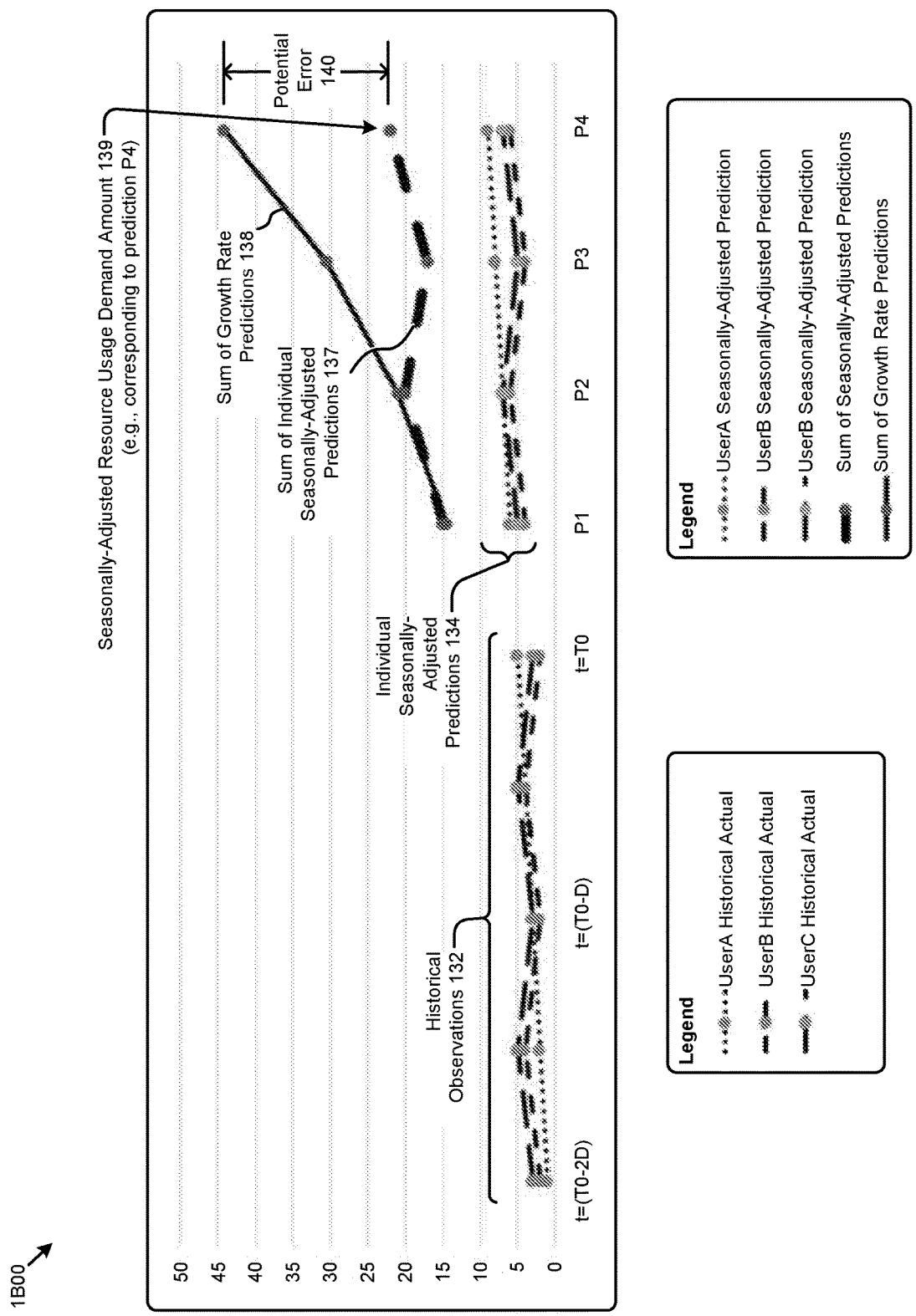
FIG. 1B presents a graphical depiction of use of a time series of resource usage values for making provisioning recommendations in accordance with some embodiments.

A numeric example of applying the steps of prediction system 110 to a time series of resource usage data is given in FIG. 1B.

FIG. 1B presents a graphical depiction 1B00 of use of a time series of resource usage values for making provisioning recommendations. The depiction pertains to making historical observations and making predictions relative from a point in time labeled as "t=T0". Prior to time T0, the system makes historical observations 132 pertaining to usage measurements of a particular resource for each of a particular set of users of that resource. As shown at "t=T-D" and at "t=T-2D" (where "D" is a time difference), the system makes observations of users' historical actual usage (e.g., UserA Historical Actual, UserB Historical Actual, UserC Historical Actual,) and stores the observations/measurements in a persistent storage location. At a time increment after time=T0, the system (1) performs analysis over the historical actual usage, (2) determines seasonality if any in a particular user's usage over time, and (3) makes predictions based on the determined seasonality.

The predictions can extend into the future (e.g., after time=T0), such as depicted by the point in time predictions "P1", "P2", "P3", and "P4". The determination of seasonality in patterns of historical actual usage by individual users (and application of respective predictive models) results in individual seasonally-adjusted predictions 134. The individual seasonally-adjusted predictions 134 are summed (e.g., as shown by the line segment labeled sum of individual seasonally-adjusted predictions 137). Given sets of individual seasonality patterns, it can happen that the prediction for one particular individual user can go up, which increase in usage can be offset by the prediction for another particular individual that goes down. For example, note the opposing trend predictions between UserA's P3 prediction (showing increased usage relative to the previous prediction) and UserB's P3 prediction (showing decreased usage relative to the previous prediction).

Accordingly, the sum of individual seasonally-adjusted predictions 137 can be used to calculate an overall future resource usage demand that can be used to make accurate provisioning decisions. As shown, the trend line depicted as the sum of individual seasonally-adjusted predictions 137 can be used for calculating seasonally-adjusted resource usage demand amounts 139, which in turn can be used to make provisioning decisions. In some cases, calculation of instances of seasonally-adjusted resource usage demand amounts 139 includes conversion from a measured amount (e.g., bytes or megabytes) into another unit such as terabytes.

As shown in this example, the trend line formed by the sum of individual seasonally-adjusted predictions is quite substantially less than the trend line that occurs when applying a growth rate to make predictions (e.g., as shown by the sum of growth rate predictions 138). The effect of potential over provisioning is shown as potential error 140.

Any of the aforementioned computing tasks of making observations of users' historical actual usage, performing analysis over the historical actual usage observations, determining seasonality in a particular user's usage over time, determining a predictive model, and making predictions using the predictive model can be implemented in embodiments of the foregoing prediction system 110. Moreover, embodiments of prediction system 110 can be hosted in any environment.

Figure 2:
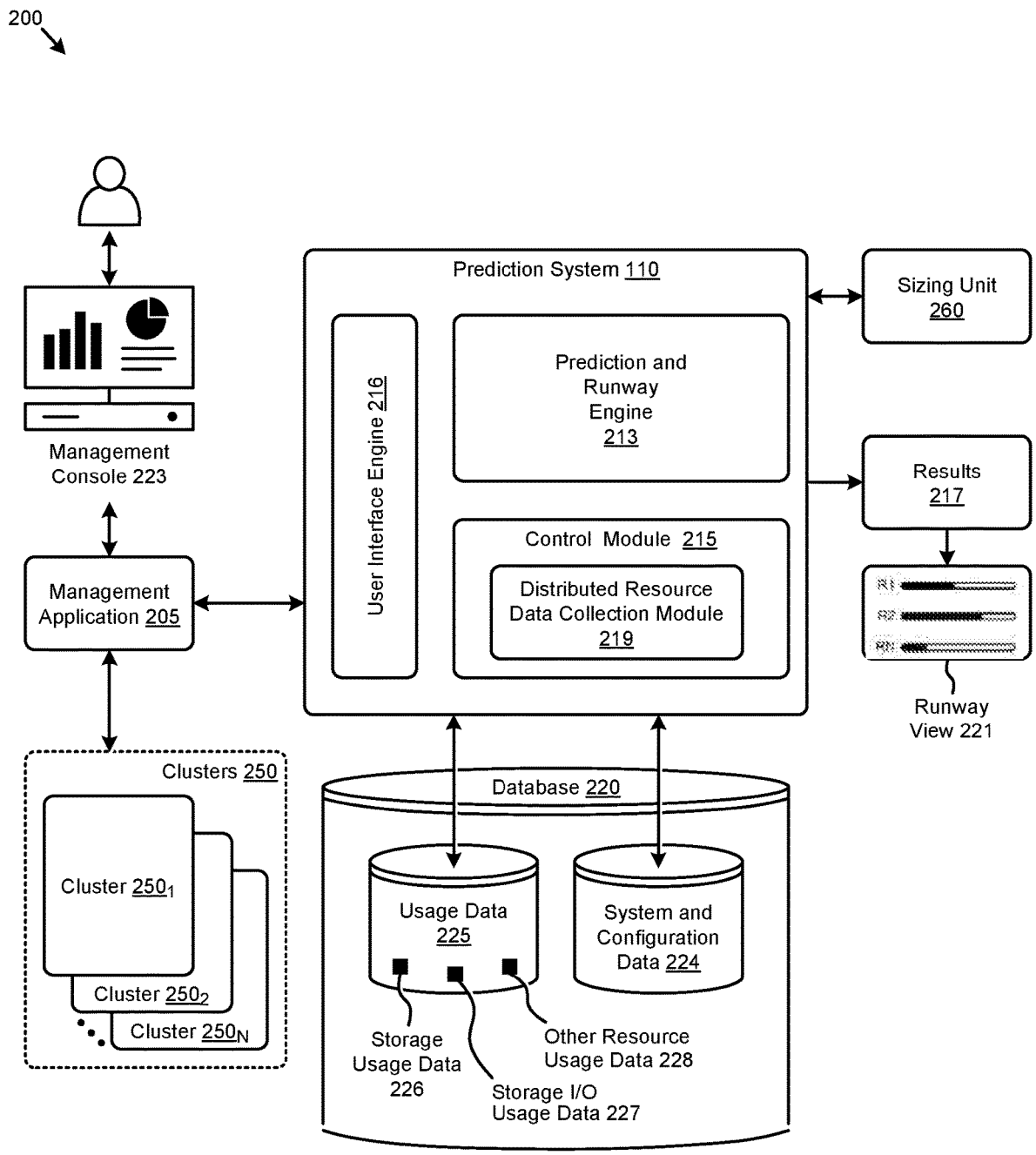
FIG. 2 illustrates an analytics computing environment including a prediction system in which some embodiments are implemented.

FIG. 2 illustrates an analytics computing environment 200 including prediction system 110 in which some embodiments are implemented. Various aspects of the embodiments may be implemented separately or as a whole.

The prediction system 110 provides an apparatus for a prediction and runway engine 213. The prediction and runway engine handles the various aspects associated with (1) taking usage data measurements (e.g., storage usage data 226, storage I/O usage data 227, or other resource usage data 228), (2) capturing system data (e.g., as system and configuration data 224), (3) organizing retrieved usage data, (4) evaluating and training prediction models, (5) selecting one of many candidate prediction models, and (6) generating predictions based on forecasts arising from selected prediction models. Some embodiments use the forecasts and/or corresponding trend line to compute a resource runway that refers to a future time period when the current provisioning of a resource is predicted to be demanded to its capacity. Some embodiments recommend hardware or software changes. The prediction and runway engine 213 implements methods for generating predictions and computing runways for any of the resources included in the shown clusters 250.

A time-series retrieval facility within the prediction and runway engine 213 retrieves usage data from database 220. The usage data comprises observations of specific resource uses over a historical timeframe. The retrieved usage data is used by prediction models of the prediction and runway engine to compute predictions based on the historical observations. More particularly, the foregoing predictions may be based on observations taken at a hardware component level, or may be based on observations taken at the level of a logical component, such as pertaining to an individual hardware disk or virtual vDisk, or as pertaining to a logical abstraction of a hardware component or portion thereof, such as a storage container mounted from a storage pool comprised of a plurality of individual storage devices. As will be discussed more fully below, the shown distributed resource data collection module 219 uses some or all of the (1) usage data and (2) system and configuration data to generate, train, predict, recommend, and otherwise output results. The usage data can pertain to any resource observations accessible to the prediction system, and system and configuration data pertains to any aspect of topology, and/or users, and/or hardware or software installed, and/or any features of any of the foregoing. The system and configuration data is used as discussed herein at least to identify users and their respective resource demands (e.g., for storage areas, vDisks, CPU demand, memory demand, storage I/O demand, network bandwidth demand, etc.)

Furthermore, the output/results of the prediction system may be stored, displayed, or otherwise used locally or remotely as appropriate.

The prediction system may be operated via a management console, such as management console 223, or via user stations, or other devices that include any type of computing station that may be used to operate or interface with the prediction system. Examples of such management consoles, user stations, and other devices include, for example, workstations, personal computers, servers, and/or remote computing terminals, which may also include one or more input devices for the user to provide operational control over the activities of the system, such as a mouse or keyboard, to manipulate a pointing object in a graphical user interface.

Further, the prediction system may be associated with or operate on one or more clusters. The one or more clusters may be managed via a management application 205 wherein the management application may provide a means for the prediction system to interface with the one or more clusters, or may provide a means of operation of the prediction system on a cluster, and may be further accessed remotely via another user station or management console. For instance, the management application may enable modules within the analytics computing environment to access one or more databases on one or more clusters for retrieval and storage of data.

In some embodiments, the distributed resource data collection module 219 may operate within a virtualized network environment, where the prediction system automatically identifies usage data and system configuration data based on the configuration of storage areas, and/or based on the topology of the virtualized network environment itself. More specifically, the distributed resource data collection module 219 accesses a database 220 or accesses a storage pool to collect historical time series datasets, individual ones of the time series datasets comprising time-oriented usage data of respective individual resources such a storage area usage data or other resource usage data.

In some embodiments, the distributed resource data collection module 219 operates within or under or by a management console for a plurality of virtualized network environments, where the prediction system may further identify usage data and/or system configuration data based on the virtualized network environments themselves. The predictions of the prediction system, whether taken singly or in combination may be used to recommend migration of infrastructure and workloads between the virtualized network environments.

FIG. 2 further illustrates a partitioning of constituent modules of the prediction system 110 of FIG. 1A. The prediction system shown in FIG. 2 is set within a virtualization environment. The prediction system includes a control module 215, a user interface engine 216, a database 220 for persistent storage (e.g., of any variations of usage data 225, system and configuration data 224, etc.), a sizing unit 260, and a unit for outputting any one or more forms of results 217. As shown, results might include use of graphical user interfaces that employ display screen devices to present charts such as are depicted by runway view 221. The foregoing elements and their interaction within the virtualization environment are discussed further below.

The control module 215 and user interface engine 216 facilitate user interaction with the system. For instance, the control module may be used to coordinate the operation of the distributed resource data collection module 219, such as when certain event occur the control module may be used to provide for the scheduling and/or execution of other processes of the prediction system. The user interface engine provides a means for a user to interact with the prediction system either remotely or via a local instance of the user interface engine such as through a traditional application graphical user interface or via a text-based user console.

The prediction system may interface with a one or more databases, such as database 220, which database contains locations for storing and/or retrieving relevant inputs and/or outputs (e.g., the shown results 217). The database may comprise any combination of physical and logical structures as are used for database systems, such as hard disk drives (HDDs), solid state drives (SSDs), logical partitions and the like. Here, database 220 is illustrated as a single database containing usage data as well as system and configuration data, however other data partitioning is possible. For instance, as discussed above, the database may be associated with one or more clusters 250 (e.g., cluster $250_1$, cluster $250_2$, . . . cluster $250_N$) that is separate and distinct from the shown prediction system 110. Furthermore, the database may be accessible via a remote server or the database or may include multiple separate databases that contains some portion of the usage data and/or system and configuration data.

Usage data 225 comprises data that represents the usage of the resources of the system or systems to be evaluated. Usage data may be stored jointly or separately on one or more databases or on a single database, such as the database 220 as illustrated here.

System and configuration data 224 comprises data that represents the functions and configuration of the resources of the system to be evaluated. System and configuration data may be stored jointly or separately on one or more databases or on a single database such as the database 220 as illustrated here.

Further details regarding methods and mechanisms for implementing the virtualization environment illustrated in FIG. 2 are described in U.S. Pat. No. 8,601,473, which is hereby incorporated by reference in its entirety.

Additionally, in some cases the prediction system can use a sizing unit 260 to determine recommendations for hardware and/or software changes, which can be particularly useful for migration of hardware/software between systems and for selecting additional/different hardware/software for a given system, such as to increase the available runway of one or more resources. While any appropriate sizing unit may be used, further details regarding a particular method and mechanism for implementing a sizing unit is described in U.S. patent application Ser. No. 15/298,107, entitled "METHOD AND APPARATUS FOR DECLARATIVE DEFINITION OF INFRASTRUCTURE COMPONENTS, SOFTWARE, WORKLOADS, AND SIZING FORMULAS FOR SIZING SYSTEM", filed Oct. 19, 2016, which is hereby incorporated by reference in its entirety.

Figure 3:
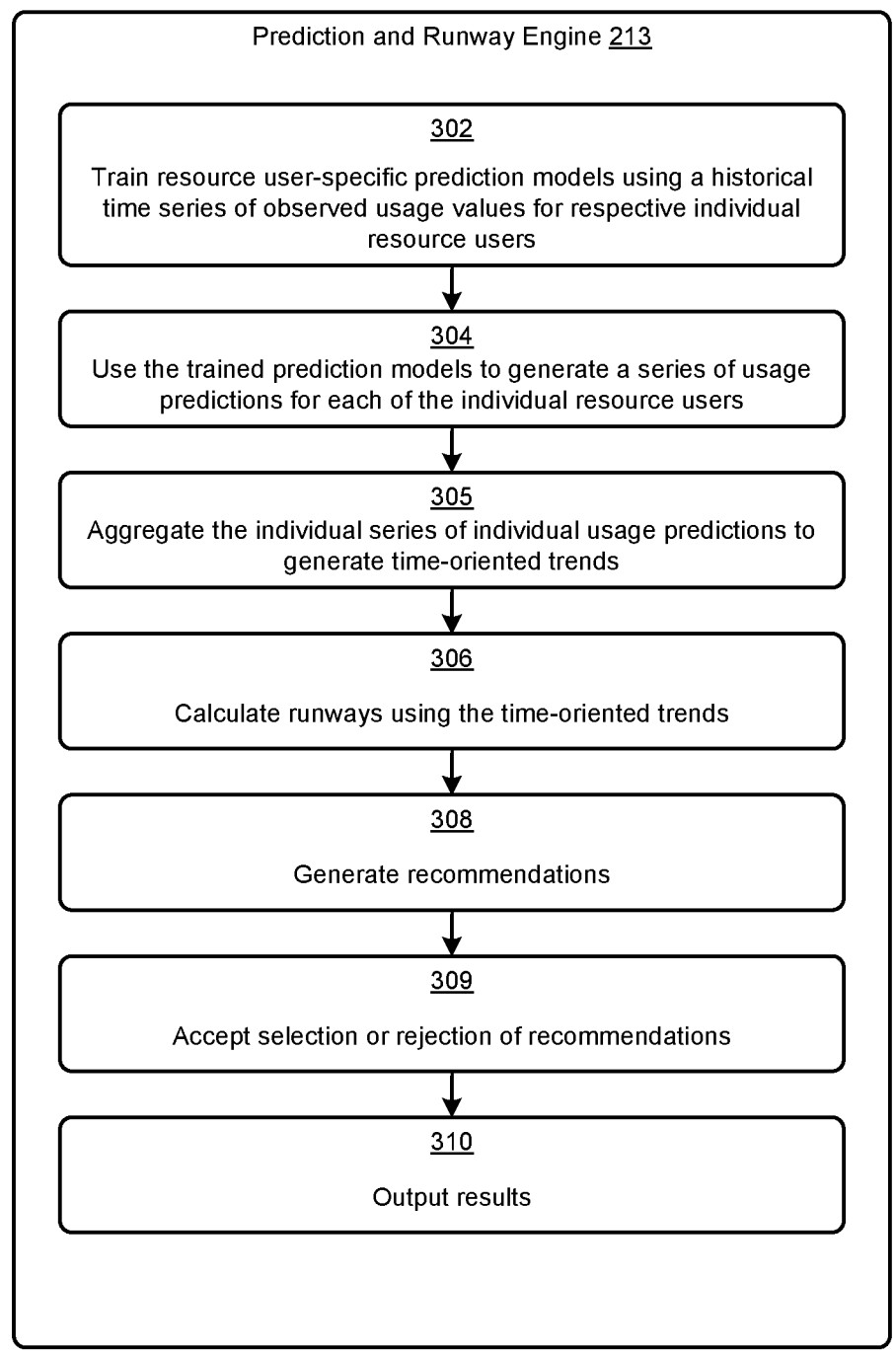
FIG. 3 is a flowchart showing operations of the prediction system in accordance with some embodiments.

FIG. 3 is a flowchart 300 showing operations of the prediction system in accordance with some embodiments. However, various aspects of the embodiments may be implemented separately or as a whole.

The processes of flowchart 300 generally include: (1) steps for training prediction models on the distributed resource, (2) steps for training prediction models on the virtualization environment, (3) steps for searching for a distributed resource and virtualization environment runway, (4) steps for generating recommendations, and (5) steps for outputting results. General apparatus and methods for a prediction system, though any appropriate prediction system may be used. Some approaches for analyzing time series for use in forecasting models are discussed in U.S. patent application Ser. No. 15/251,244, entitled "TIME SERIES ANALYSIS AND FORECASTING USING A DISTRIBUTED TOURNAMENT SELECTION PROCESS", filed Aug. 30, 2016, which is hereby incorporated by reference in its entirety.

The training of prediction models, at step 302, can be accomplished using distributed processes, such as where a tournament is implemented using a map reduce technique to determine the best model or models to use to predict future usage based on a past time window. In the present disclosure this comprises training prediction models for a plurality of occurrences of the past time window data using a first series of time-oriented data selected from the past time window datasets (e.g., where the training uses a first time series dataset for a respective individual distributed resource). A second series of time-oriented data is used in conjunction with a corresponding trained prediction model to predict future usage. The training might include a model-specific evaluation or determination of quantitative measures such as precision and recall that can be expected of the trained model when the trained model is applied to a different set of data (e.g., different that the training datasets). More specifically, the model-specific evaluation incudes determination of quantitative measures that correspond to statistical calculations that refer to predictive accuracy (e.g., a statistical confidence interval). In some cases, the predictive accuracy that can be achieved by particular predictive model is influenced by determination by the range of data used for training. More specifically some model training techniques and model application techniques involve determination of a training set of time series data that exhibits seasonality (e.g., periodicity).

Further information and techniques pertaining to seasonal time series data analysis are described in U.S. patent application Ser. No. 15/283,004, entitled "DYNAMIC RESOURCE DISTRIBUTION USING PERIODICITY-AWARE PREDICTIVE MODELING", filed Sep. 30, 2016, which is hereby incorporated by reference in its entirety.

Range of Resources

A distributed resource may be representative of an individual component or aspect thereof, such as a processor, or logical core (such as Intel's hyper-threading technology), or a distributed resource may be representative of usage of storage space such as is provided by a storage container on a storage pool that is comprised of multiple non-volatile storage devices distributed across the virtualization system.

In an illustrative example of usage of storage space, a distributed resource (such as a storage container on a storage pool) is be provided for use by an individual employee at a company, or the distributed resource may be provided for a company itself, with further subdivisions of that distributed resource across departments or employees of the company. In some cases, a cluster may be used to serve multiple companies or other entities, such as a combination of email hosting (e.g., "Exchange") services, virtual desktop users, websites, or other functions. Under these circumstances the individual functions and users may present a multitude of different usage patterns such that the sum of the individual predictions may be more accurate than the predictions for the sum. For instance, with respect to processor utilization, the individual computing power of the processors may be predicted based on function, such as exchange hosting, website hosting, and virtual desktop hosting, or any other subdivisions or categorizations. In this way, the system could be used to determine if any particular category or function is disproportionately utilizing the resources and if/when the resources assigned or available to that function will be insufficient.

At step 304, using the trained models, future usage predictions can be made, and moreover, when seasonality-aware models are used, the seasonality can be included in the predictions. For example, if an accounting department uses 30% of their allotted storage quota for the first 10 weeks of each quarter, and then uses 90% of their allotted quota in the last 2 weeks of the quarter, then the prediction for a future quarter might have a similar shape. Moreover, if the quarter-on-quarter growth rate was observed to be roughly 10% growth peak-to-peak, then the runway might be only one future quarter inasmuch as the peak of 90% plus 10% of 90% (or 9%) brings the total to 99% near the end of the next future quarter. Given predictions and quota limits or available capacities, the time-oriented runway can be calculated. As shown and described as pertaining to step 302, seasonally-adjusted predictions can be made for individual users. At another step seasonally-adjusted predictions can be made for the aggregate usage of the individual users.

At step 304, the trained prediction models are used to generate a plurality of usage predictions for each of the individual users. The plurality of usage predictions for each of the individual users are in turn used to generate trend lines. In one case, a sum function is used to aggregate groups of the time-oriented series of usage predictions to form seasonally-adjusted trends.

At 305, the plurality of usage predictions for each of the individual users generated in step 304 are aggregated (e.g., by adding corresponding data values at each time point of the forecasted usage predictions). In this way an overall forecast for the entire virtualization environment may be determined. This overall forecast can be used to train a baseline model or can be used for informing any of a variety of quantitative factors that are used for computation of predictions, and/or for computation of recommendations, limits, and/or and other results. As one specific example of use of the overall usage for the entire virtualization environment, consider that when actual individual usage for each of the individual users are summed, that is the actual usage for the overall entire virtualization environment, at least within the margin of error of the measurements. However, in the case of predictions, when individual usage predictions for each of the individual users are summed, that sum of predictions might vary from the predicted usage for the overall entire virtualization environment. In some cases, the prediction variance is greater than the margin of error of the measurements. The calculable prediction variance is compared to other statistics (e.g., confidence intervals), and a test is performed to determine if the aggregated (e.g., sum) of all individual usage predictions for each individual users is statistically within acceptable bounds with respect to the predicted usage for the entire virtualization environment.

Given the seasonally-adjusted trends, at step 306, the seasonally-adjusted trends are used to calculate runways for any or all of the individual distributed resources as well as for the aggregation of the individual distributed resources. This serves two distinct purposes. First, this provides information for cluster operators such as a system administrator or other manager or agent to be informed of individual and aggregate usage. In particular, a user interface is provided that shows trend lines for resources that are predicted to fall short of demand, thus suggesting or necessitating the purchase or acquisition of more capacity. Second this provides the cluster operators with accurate predictions as to when the cluster as a whole will no longer be able to meet the needs of its users.

The virtualization environment runway and predictions may be determined solely based on the trained prediction model or models for the virtualization environment as a whole. In the alternative, the virtualization environment runway and predictions may be determined solely based on an aggregation of the prediction models for the individual distributed resources.

The generation of predictions and computations of runways may occur at a single processing node, or may be distributed across multiple nodes as disclosed in the application cited here.

The process of flowchart 300 include step 308 where recommendations are generated based on usage of the virtualization environment, and the results are output to a database, visual medium or other means as discussed in U.S. patent application Ser. No. 15/251,244, entitled "TIME SERIES ANALYSIS AND FORECASTING USING A DISTRIBUTED TOURNAMENT SELECTION PROCESS", filed Aug. 30, 2016, which is hereby incorporated by reference in its entirety.

The recommendation of step 308 can be accepted or rejected (at step 309) by a user (e.g., a system administrator). The acts of accepting or rejecting recommendations, and/or the effect on the virtualized system resulting from acceptance or rejection of recommendations can be displayed (at step 310), possibly using a graphical user interface screen device such as runway view 221, and/or any other technique to use, calculate or display results 217.

In some embodiments, the runway view 221 derives from a time series of summed predictions, where each of the summed predictions are associated with a respective future time. One or more of more of such summed predictions are compared to a corresponding resource to form a runway view that shows when the resource is predicted to be depleted.

Figure 4:
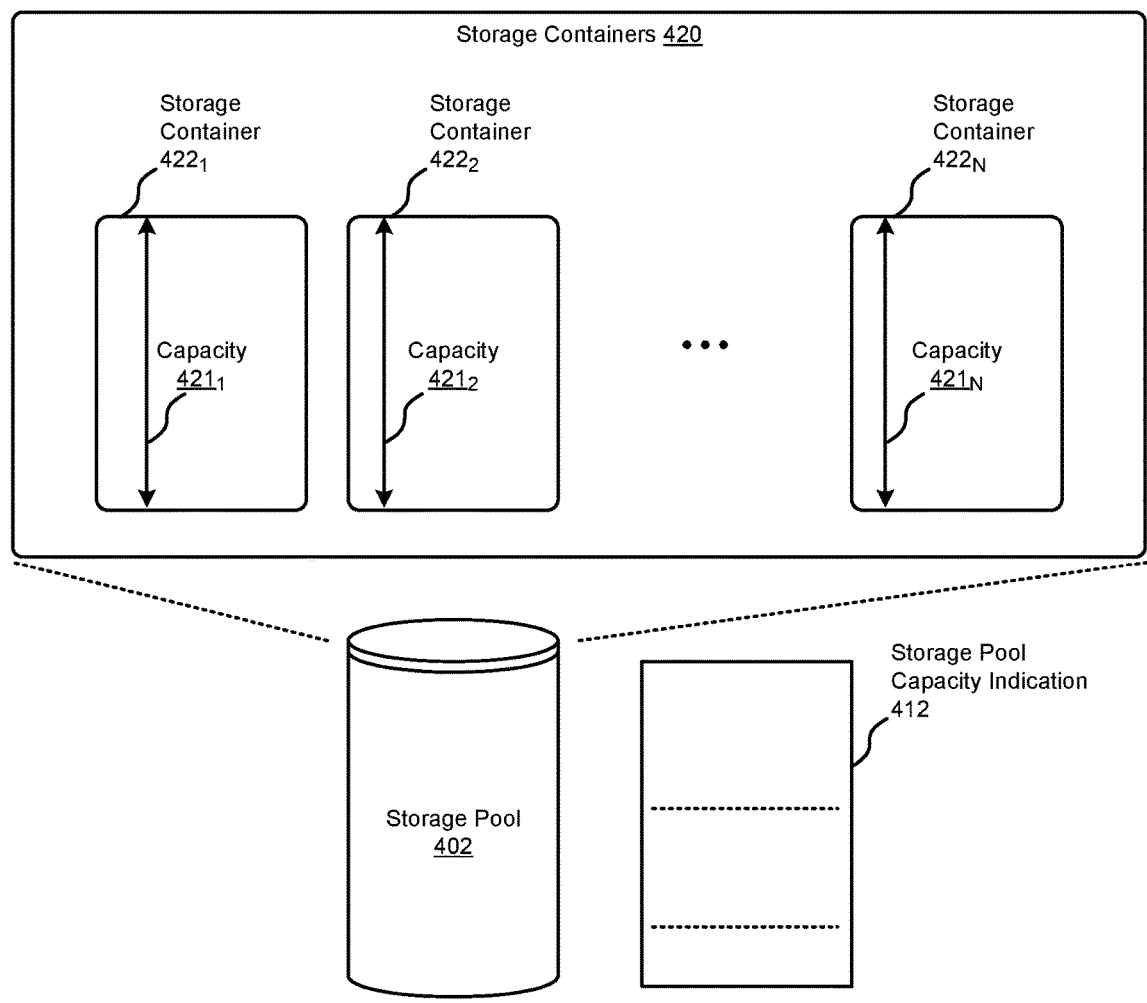
FIG. 4 is a storage pool schematic representation.

FIG. 4 is a storage pool schematic representation 400. FIG. 4 and the following FIG. 5A through FIG. 5F each provide an illustration of storage pool capacity with respect to individual storage containers in a storage pool. These figures are intended to serve solely as an illustrative example and should not be construed as limiting the present disclosure herein unless explicitly recited in the claims.

FIG. 4 provides an illustration of the contents of a storage pool 402 as a plurality of storage containers (e.g., storage container $422_1$, storage container $422_2$, . . . , and storage container $422_N$). As used in the illustrations herein, a metric for the storage pool capacity is presented at storage pool capacity indication 412.

Storage pool 402 is an abstraction of the aggregation of the individual storage devices of the cluster such that they appear to be a single homogenous volume despite comprising many different physical devices on multiple different nodes. Furthermore, there may be additional logical volumes such as slower backend storage devices used to store and serve less frequently accessed data. The storage pool may be divided into one or more storage containers as shown, such that the storage pool is divided into one or more smaller logical volumes that will be presented to the entities or user either directly or indirectly via a subordinate volume. The storage containers as shown and discussed in this and the following examples are representations of storage areas. The storage areas might be representative of files or objects or might be virtual disks (e.g., with or without being populated with actual data), or storage areas might be representative of storage space needed for virtual machines or swarms of virtual machines, etc.

Often, storage pools use quotas for the entities or users associated with the logical volumes. However, these quotas represent merely logical limits on the usage of the entities or users, such that, for the purposes of predicting usage, a presumption is made that the entities or users will not use more storage space than if allocated in the quota. This can present logical limits on the actual storage space that will be necessary to provide for the needs of the entities or users. In other systems, no quotas or limits on the entities or users is provided, and when predictions are made, no logical limits on predicted use is enforced, which technique may provide a more accurate prediction of the needs of the entities or users. In yet other systems or regimes, some entities or users may be subject to quotas while other entities or users may not be subject to quotas. Furthermore, quotas or any combination of quotas or lack thereof may be used for other resources other than storage areas, such as the resource of CPU utilization, the resource of GPU utilization, the resource of network bandwidth, or any other distributed resource that is quantifiable, measurable, and can be subjected to allocations or limits.

The set of objects within storage containers 420 each have their own individual capacities (e.g., $421_1$, $421_2$, . . . , $421_N$). The storage containers illustrated here are shown as being of the same height although the actual storage containers and their respective storage areas may be of varying sizes. In many circumstances the sum of the advertised size of the individual storage containers will be greater than the actual capacity of the storage pool. This is because most storage containers will utilize thin provisioning such that their size will vary with the amount of storage space used. The thin provisioned volumes themselves will pull from the same pool of available storage, up until the point where the storage containers have reached their advertised capacity. As a result, it is quite possible, and even common, to have the total aggregate advertised capacity to far exceed the actual total capacity of the storage pool.

This presents added difficulty for generating predictions and determining the available runway for a cluster, which is shown and discussed in more detail in FIGS. 5A through FIG. 5F. Specifically, the following discussion serves as an illustration of the relationship between the storage containers, the storage pool, and their effects on each other.

FIG. 5A through FIG. 5F illustrate example storage pool utilization scenarios in accordance with some embodiments. The figures are not intended to limit the invention unless explicitly claimed as such, but merely serve as a means of illustration for the present disclosure. More specifically, FIG. 5A through FIG. 5F illustrate example configurations of the storage pool heretofore shown and described as pertaining to FIG. 4.

Figure 5A:
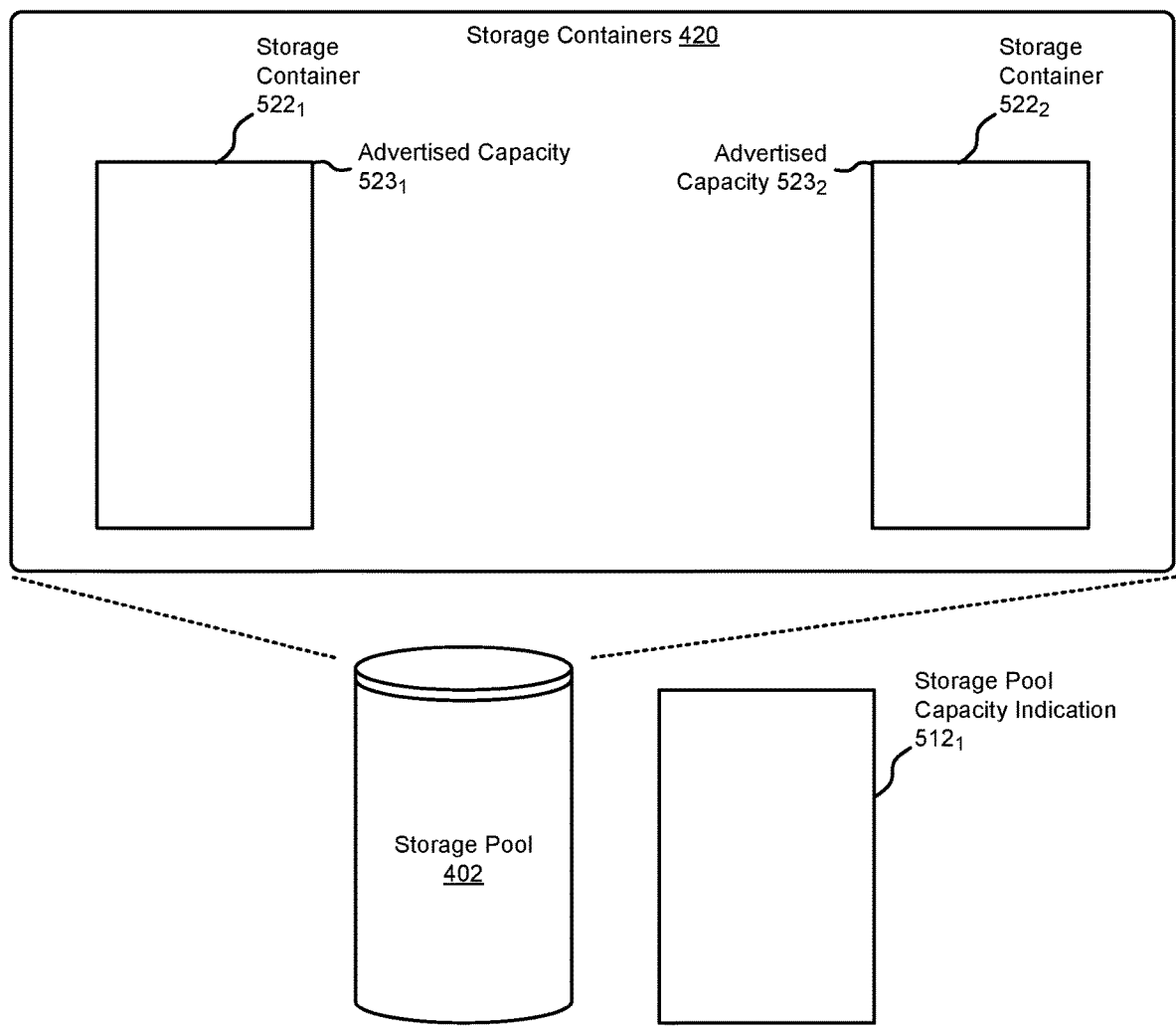
FIG. 5A through FIG. 5F illustrate example storage pool utilization scenarios in accordance with some embodiments.

FIG. 5A illustrates storage container $522_1$ and storage container $522_2$, each having the same advertised capacities (e.g., advertised capacity $523_1$ and advertised capacity $523_2$) and, in this example, with each storage container having the same advertised capacity as the actual capacity of the storage pool capacity indication $512_1$. In the following figures FIG. 5B through FIG. 5F, corresponding storage pool capacity indications are shown as storage pool capacity indication $512_2$, indication $512_3$, indication $512_4$, indication $512_5$, and indication $512_6$, respectively.

The two storage containers as illustrated here have zero used capacity (i.e., no storage space is used in either of the shown storage containers). In some storage pool and/or storage area implementations, each storage container is likely to have an associated amount of overhead associated with its management and configuration; for the sake of illustration this overhead is ignored.

Figure 5B:
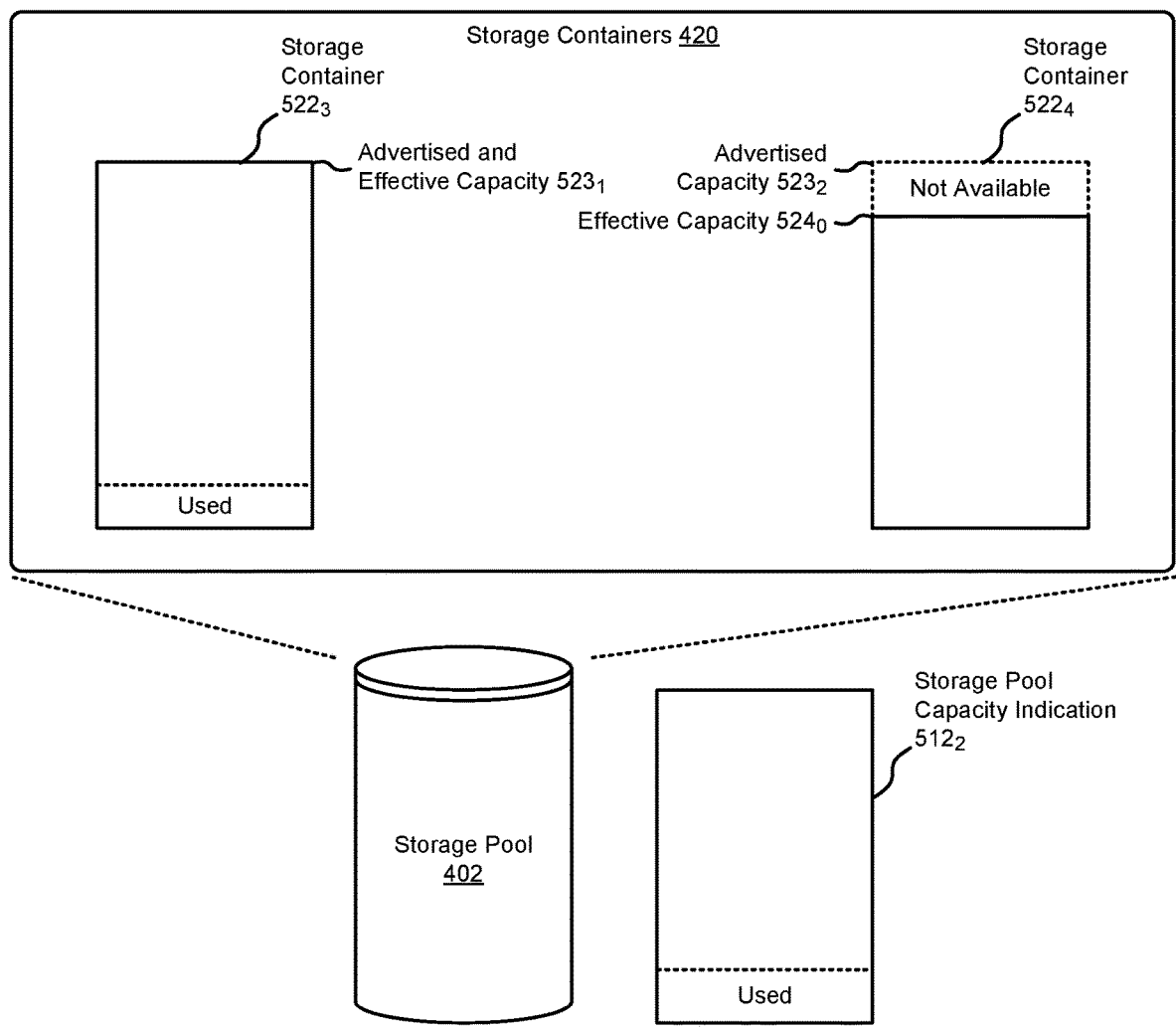

FIG. 5B illustrates a relatively small amount of storage used in storage container $522_3$. Because the storage container is a logical representation of the actual storage of the cluster, use of the aforementioned relatively small amount of storage on storage container $522_3$ comprises actual use of storage capacity at the storage pool 402.

Furthermore, because storage container $522_3$ uses the same resources of the storage pool 402, a decrease in the actually available storage pool will cause a corresponding decrease in the effective capacity (maximum possible available capacity) of any other storage containers. If the storage pool has a larger capacity, the effects of the disk space used by storage container $522_3$ may not have an immediate effect on the available capacity of storage container $522_4$. However, in the present illustration, the advertised capacities of each storage container is equal to the capacity of the storage pool, therefore any disk space used by one storage container will have at least an implied effect on the other storage container(s). In the present example the use of the relatively small amount of storage by storage container $522_3$ has the effect of lowering the maximum possible capacity of storage container $522_4$ to the shown effective capacity $524_0$. In this way, the actions of one user (e.g., a user associated with storage container $522_3$) may unwittingly affect the available resources for another user (e.g., the user associated with storage container $522_4$).

This sort of provisioning (e.g., over-provisioning and sharing of the storage pool) increases the difficulty of provisioning the system. While it may be ideal to have the same amount of physical capacity as advertised capacity, such a provisioning arrangement is costly from an operations and equipment standpoint, and potentially wasteful due to the amount of unused extra capacity required to be maintained.

Figure 5C:
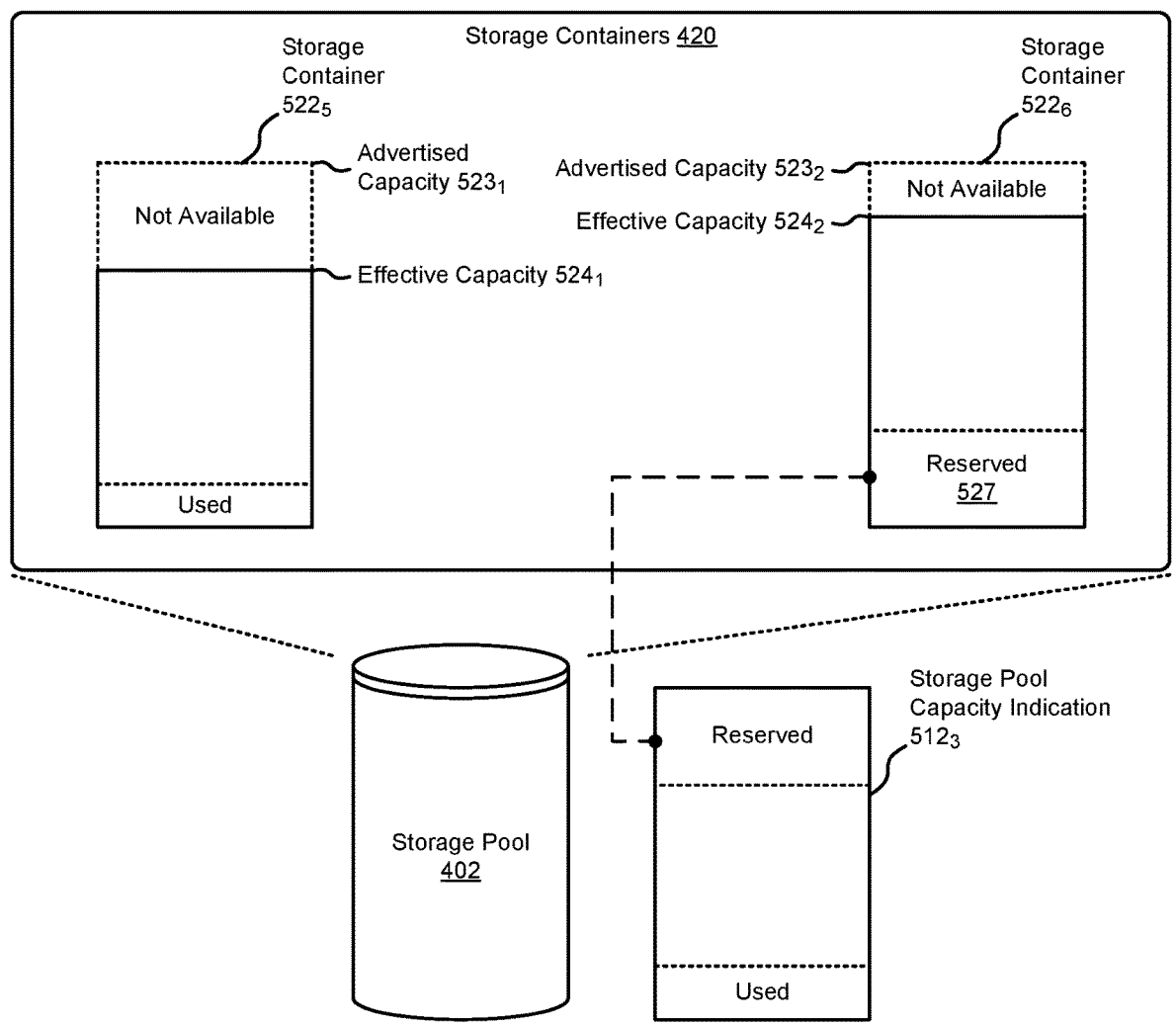

FIG. 5C continues the example of FIG. 5B and adds a reservation for a block of storage in the storage container $522_6$. (e.g., see "Reserved" 527)). In this case, the reservation represents an amount of storage space that may or may not be used. The placement in the storage container of the reservation means that the associated capacity for that reservation is also reserved in the storage pool capacity indication $512_3$ (as shown). A reservation, regardless of the actual amount of it that is used, will have an effect on the storage containers by lowering its effective maximum capacity, such as is indicated by the effective capacity $524_1$ of storage container $522_5$.

Figure 5D:
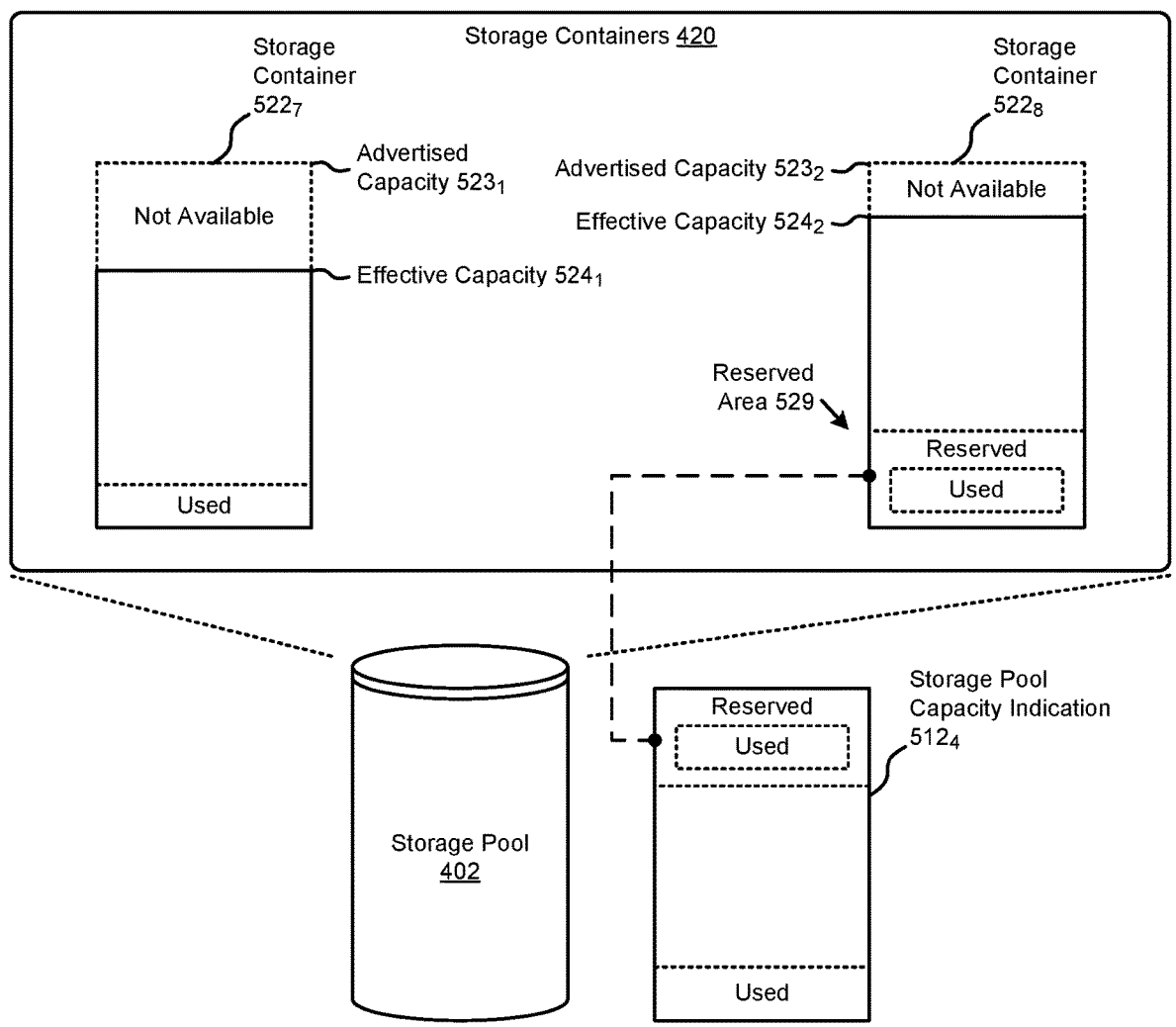

FIG. 5D provides an illustration of what happens when some of the reserved block is actually used (e.g., shown as "Used" in storage container $522_8$). Specifically, the effective capacity of the storage containers of a storage pool do not decrease when the reserved space is actually used. This is because the actually used storage from a reserved area of storage has already been reserved for that storage container. The effect is shown for storage container $522_7$ inasmuch as the advertised capacity and effective capacity remain unchanged, even after the use of reserved area 529.

Figure 5E:
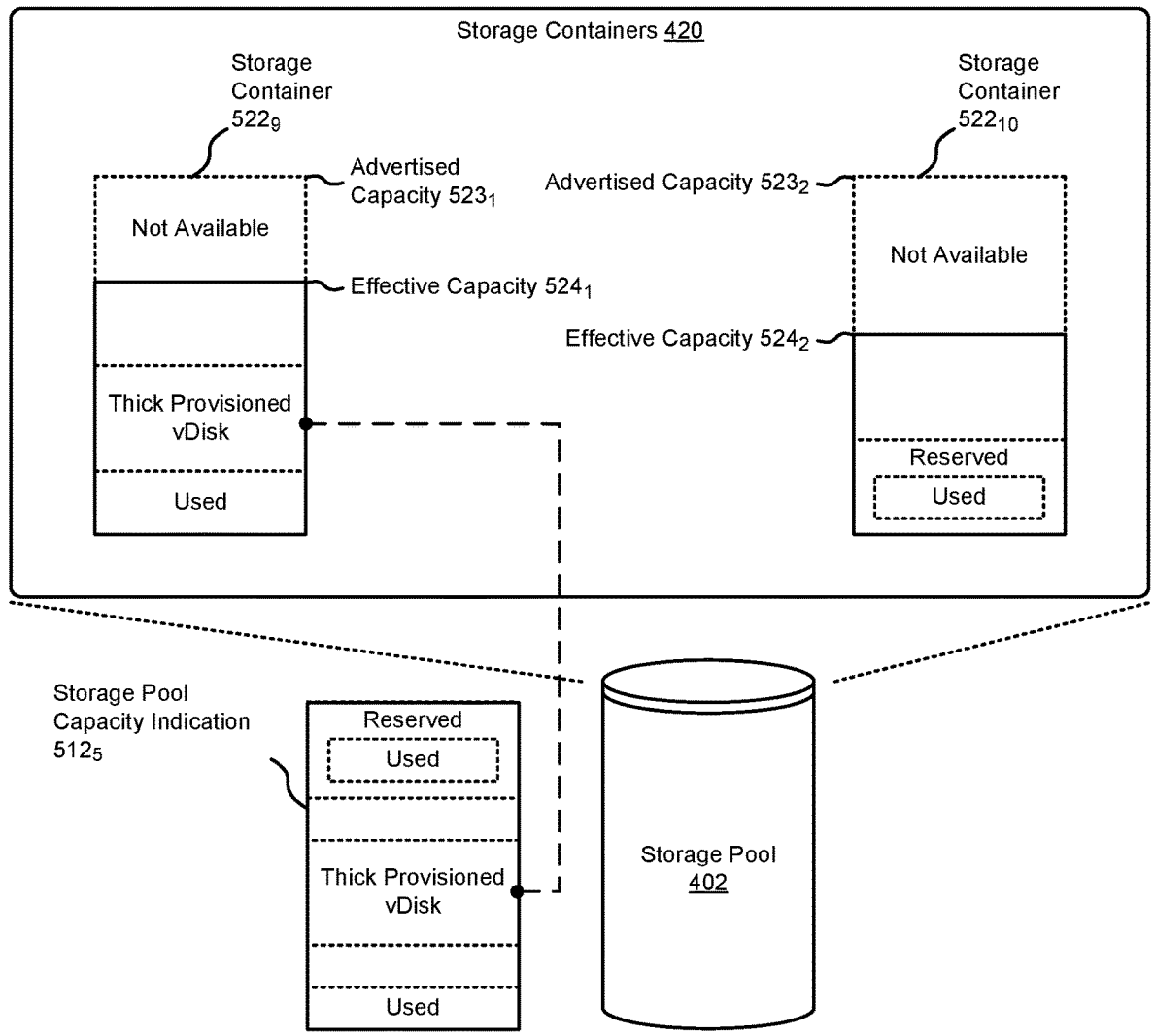
Figure 5F:
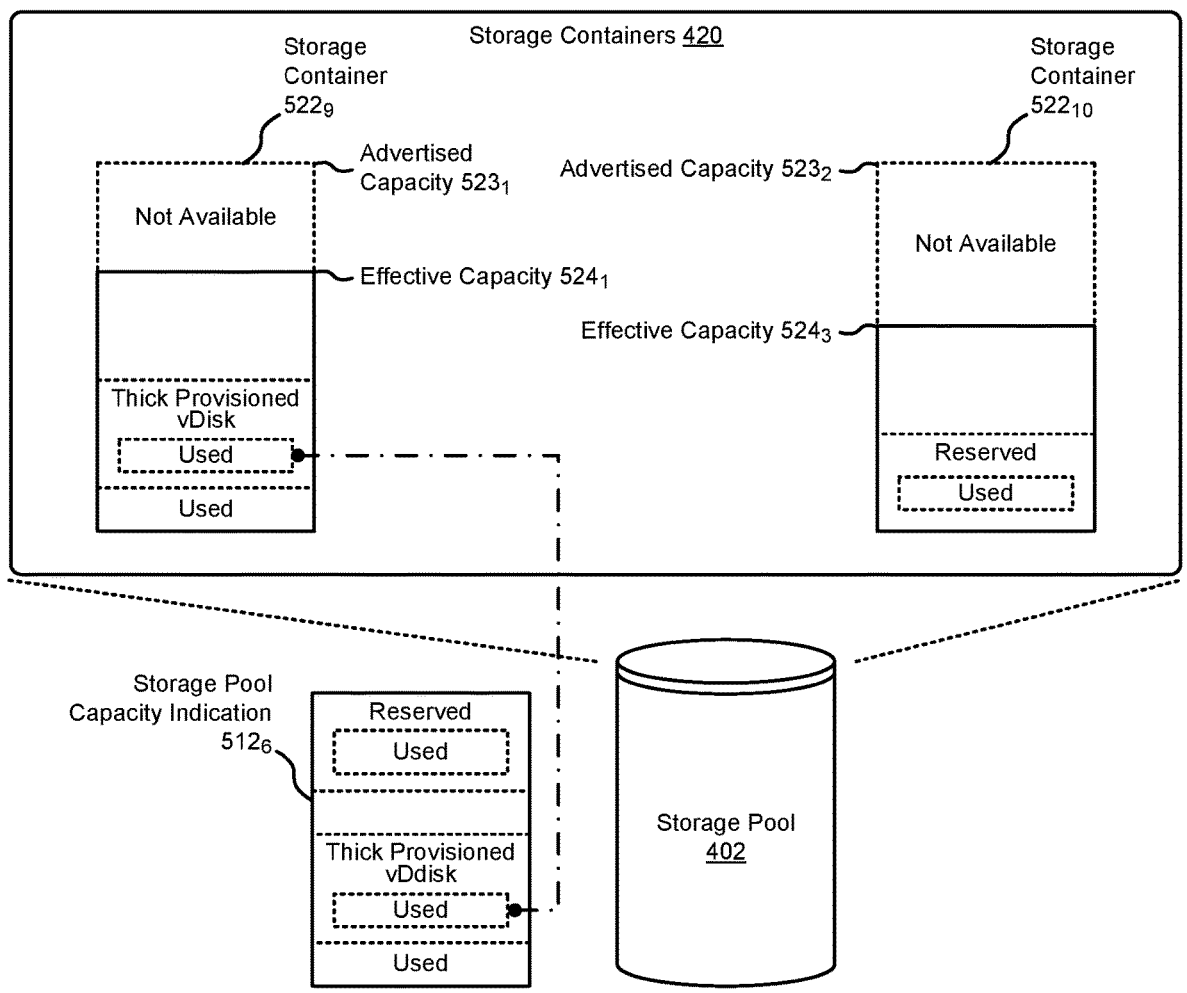

FIG. 5E and FIG. 5F illustrate the provisioning of a different type of reservation known as a thick provisioned vDisk. The thick provisioned vDisk operates similarly to a reservation in that it blocks other storage containers from using the storage space regardless of whether or not the thick provisioned vDisk is fully or partially utilized. Thick provisioned vDisks operate as a reservation of storage area, thus decreasing the available capacity of the storage pool for other storage containers. After the vDisk has been created (e.g., as shown in storage container $522_9$), the other storage containers (e.g., storage container $522_{10}$) each have an effective amount that has been decreased as a result of the thick vDisk provisioning (effective capacity $524_2$). Similarly, if a portion of the thick provisioned vDisk is then actually used (as illustrated in FIG. 5F) it will not further decrease the available storage space of the storage pool because that space has reserved prior to the aforementioned actual usage (e.g., as depicted by the shown effective capacity $524_3$).

Some embodiments of the present disclosure use a model selection technique involving a tournament. In some embodiments, map reduce techniques are used to train a prediction model or plurality of prediction models for each individual distributed resource associate with the virtualization environment. Furthermore, a system level prediction model or plurality of models may be generated for the virtualization environment, such as the storage pool illustrated above. Finally, the system level prediction models and the individual distributed resource predictions can be combined using an ordinary least squares method or weighted least squares method, which in turn can be used to generate predictions, determine runways and generate resource planning recommendations. Further details pertaining to approaches for making resource planning recommendations are disclosed in U.S. patent application Ser. No. 15/341,549, entitled "LONG-RANGE DISTRIBUTED RESOURCE PLANNING USING WORKLOAD MODELING IN HYPERCONVERGED COMPUTING CLUSTERS", filed Nov. 2, 2016, which is hereby incorporated by reference in its entirety.

Figure 6:
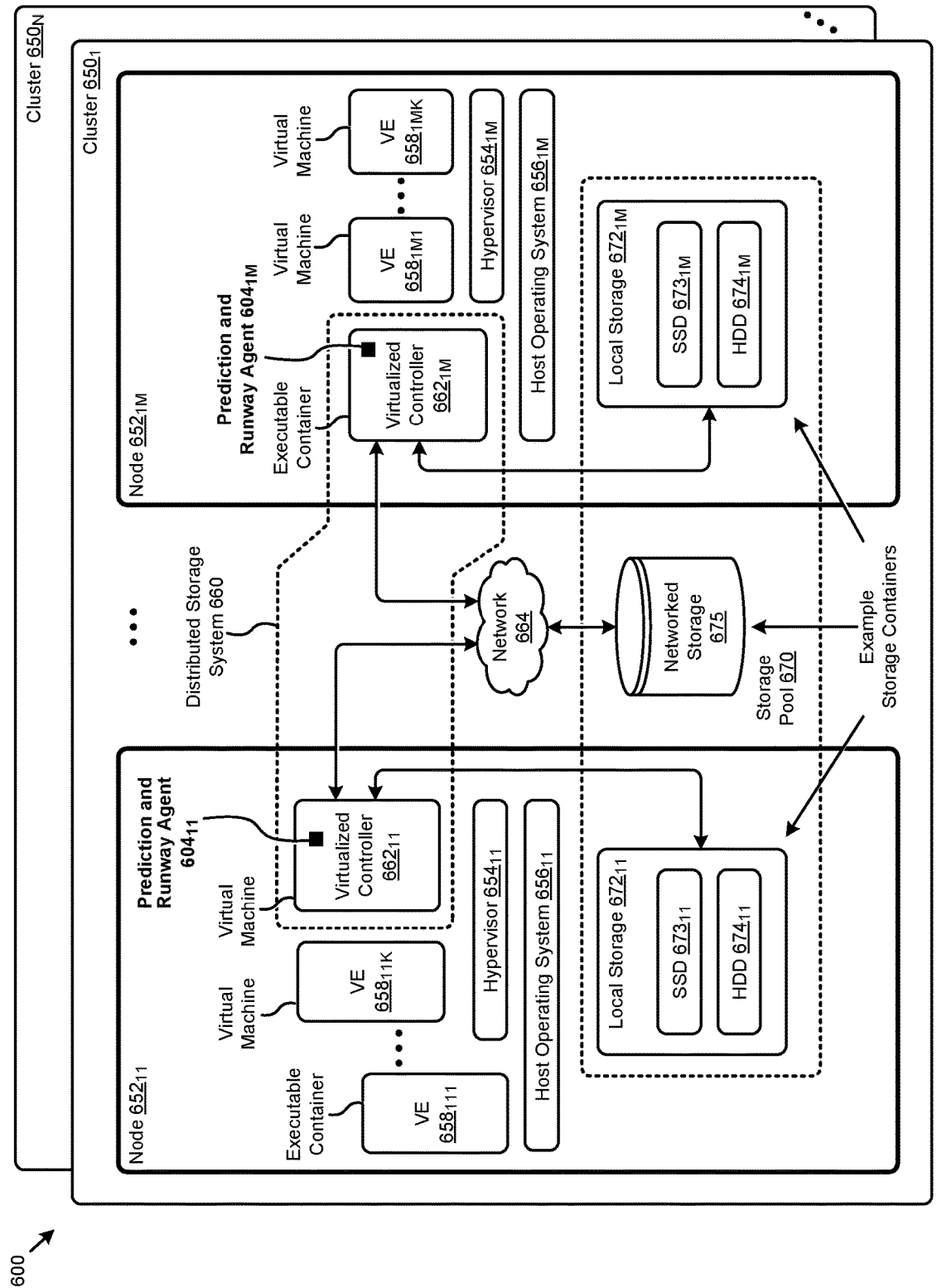
FIG. 6 illustrates a clustered virtualization environment in which some embodiments are implemented.

FIG. 6 illustrates a clustered virtualization environment in which some embodiments are implemented. One embodiment of the method for forecasting distributed resource utilization in a virtualization environment is a clustered virtualization environment, and may be interfaced with via a management console remotely or on the cluster itself. Further, information for and about the cluster may be used as inputs to the training process such that the cluster can be used to perform predictions and runway calculations either for itself, or in the alternative the cluster may receive inputs from another system or cluster and perform predictions and runway calculations for the other system.

The shown clustered virtualization environment depicts various components associated with one instance of a distributed virtualization system (e.g., hyperconverged distributed system) comprising a distributed storage system 660 that can be used to implement the herein disclosed techniques. Specifically, the clustered virtualization environment 600 comprises multiple clusters (e.g., cluster $650_1$, ..., cluster $650_N$) comprising multiple nodes that have multiple tiers of storage in a storage pool. Representative nodes (e.g., node $652_{11}$, ..., node $652_{1M}$) and storage pool 670 associated with cluster $650_1$ are shown. Each node can be associated with one server, multiple servers, or portions of a server. The nodes can be associated (e.g., logically and/or physically) with the clusters. As shown, the multiple tiers of storage include storage that is accessible through a network 664, such as a networked storage 675 (e.g., a storage area network or SAN, network attached storage or NAS, etc.). The multiple tiers of storage further include instances of local storage (e.g., local storage $672_{11}$, ..., local storage $672_{1M}$). For example, the local storage can be within or directly attached to a server and/or appliance associated with the nodes. Such local storage can include solid state drives (SSD $673_{11}$, ..., SSD $673_{1M}$), hard disk drives (HDD $674_{11}$, ..., HDD $674_{1M}$), and/or other storage devices.

As shown, the nodes in clustered virtualization environment 600 can implement one or more user virtualized entities (e.g., VE $658_{111}$, ..., VE $658_{11K}$, ..., VE $658_{1M1}$, ..., VE $658_{1MK}$), such as virtual machines (VMs) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $656_{11}$, ..., host operating system $656_{1M}$), while the VMs run multiple applications on various respective guest operating systems. Such flexibility can be facilitated at least in part by a hypervisor (e.g., hypervisor $654_{11}$, ..., hypervisor $654_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the executable containers (e.g., application containers or ACs) are implemented at the nodes in an operating system virtualization environment or container virtualization environment. The executable containers comprise groups of processes and/or resources (e.g., memory, CPU, disk, etc.) that are isolated from the node host computer and other executable containers. Such executable containers directly interface with the kernel of the host operating system (e.g., host operating system $656_{11}$, ..., host operating system $656_{1M}$) without, in most cases, a hypervisor layer. This lightweight implementation can facilitate efficient distribution of certain software components, such as applications or services (e.g., micro-services). As shown, clustered virtualization environment 600 can implement both a hypervisor-assisted virtualization environment and a container virtualization environment for various purposes.

Clustered virtualization environment 600 also comprises at least one instance of a virtualized controller to facilitate access to storage pool 670 by the VMs and/or executable containers. As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a layer in a hypervisor).

Multiple instances of such virtualized controllers can coordinate within a cluster to form the distributed storage system 660 which can, among other operations, manage the storage pool 670. This architecture further facilitates efficient scaling of the distributed virtualization system. The foregoing virtualized controllers can be implemented in clustered virtualization environment 600 using various techniques. Specifically, an instance of a virtual machine at a given node can be used as a virtualized controller in a hypervisor-assisted virtualization environment to manage storage and I/O (input/output or IO) activities. In this case, for example, the virtualized entities at node $652_{11}$ can interface with a controller virtual machine (e.g., virtualized controller $662_{11}$) through hypervisor $654_{11}$ to access the storage pool 670. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 660.

For example, a hypervisor at one node in the distributed storage system 660 might correspond to VMware ESXi software, and a hypervisor at another node in the distributed storage system 660 might correspond to Nutanix AHV software. As another virtualized controller implementation example, executable containers (e.g., Docker containers) can be used to implement a virtualized controller (e.g., virtualized controller $662_{1M}$) in an operating system virtualization environment at a given node. In this case, for example, the virtualized entities at node $652_{1M}$ can access the storage pool 670 by interfacing with a controller container (e.g., virtualized controller $662_{1M}$) through hypervisor $654_{1M}$ and/or the kernel of host operating system $656_{1M}$.

Further details pertaining to managing virtualized entities with executable containers can be found in U.S. patent application Ser. No. 15/173,577, entitled "ARCHITECTURE FOR MANAGING I/O AND STORAGE FOR A VIRTUALIZATION ENVIRONMENT USING EXECUTABLE CONTAINERS AND VIRTUAL MACHINES", filed Jun. 3, 2016.

In certain embodiments, one or more instances of an agent (e.g., an agent to implement all or part of a prediction and runway engine) can be implemented in the distributed storage system 660 to facilitate the herein disclosed techniques. Specifically, prediction and runway agent $604_{11}$ can be implemented in the virtualized controller $662_{11}$, (e.g., as a virtual machine) and/or a prediction and runway agent $604_{1M}$ can be implemented in the virtualized controller $662_{1M}$ (e.g., as an executable container). Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

In exemplary embodiments, an instance of the aforementioned distributed resource data collection module 219 can be implemented in whole or in part by an instance of a prediction and runway agent (e.g., prediction and runway agent $604_{11}$ or prediction and runway agent $604_{1M}$).

In this way, the security and robustness of a distributed storage system using virtual machines (as illustrated in FIG. 6) may be combined with efficiency and consistency of a virtualized computer/application environment.

Figure 7A:
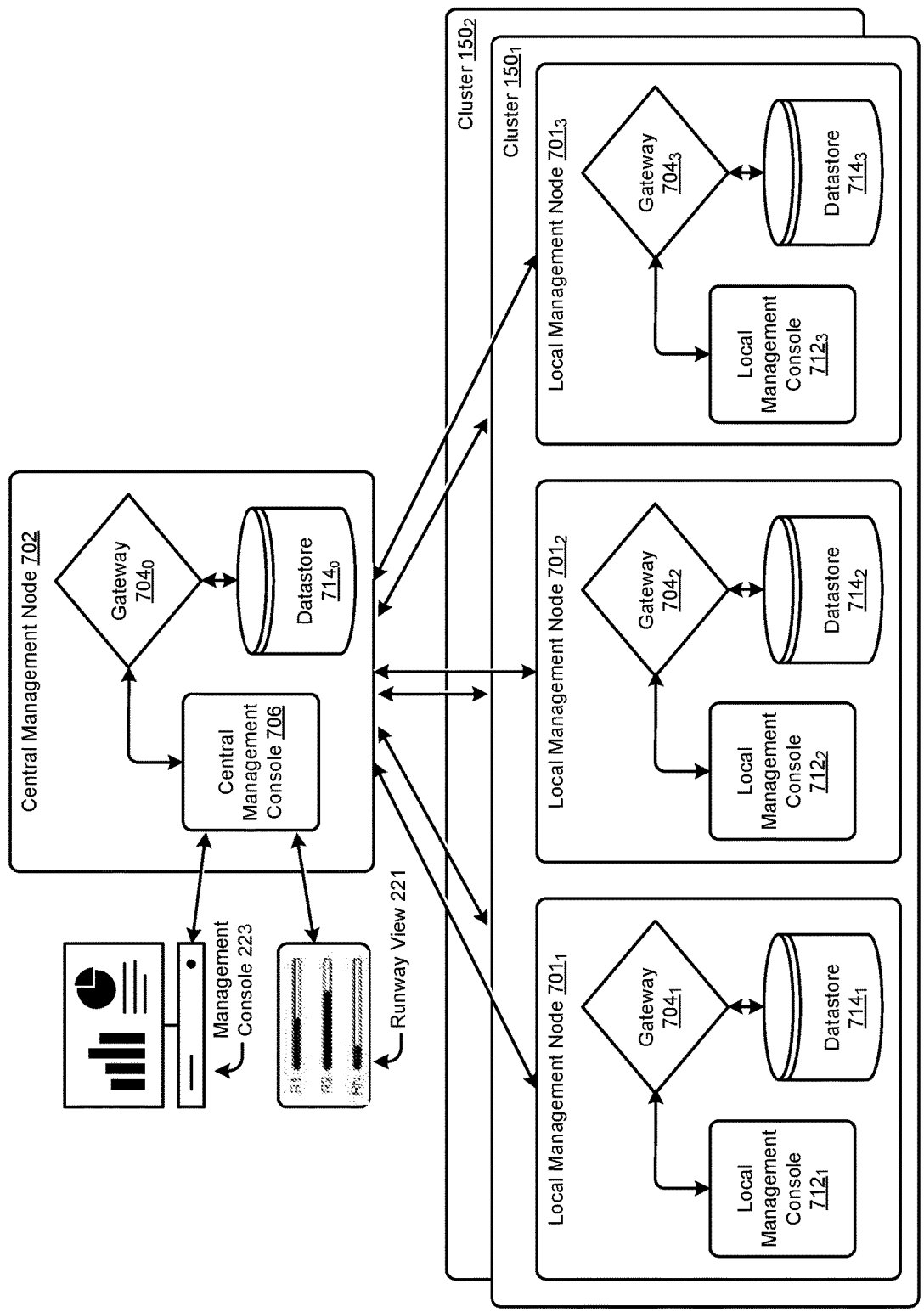
FIG. 7A and FIG. 7B illustrate management techniques for analyzing and controlling a plurality of clusters according to some embodiments of the invention.
Figure 7B:
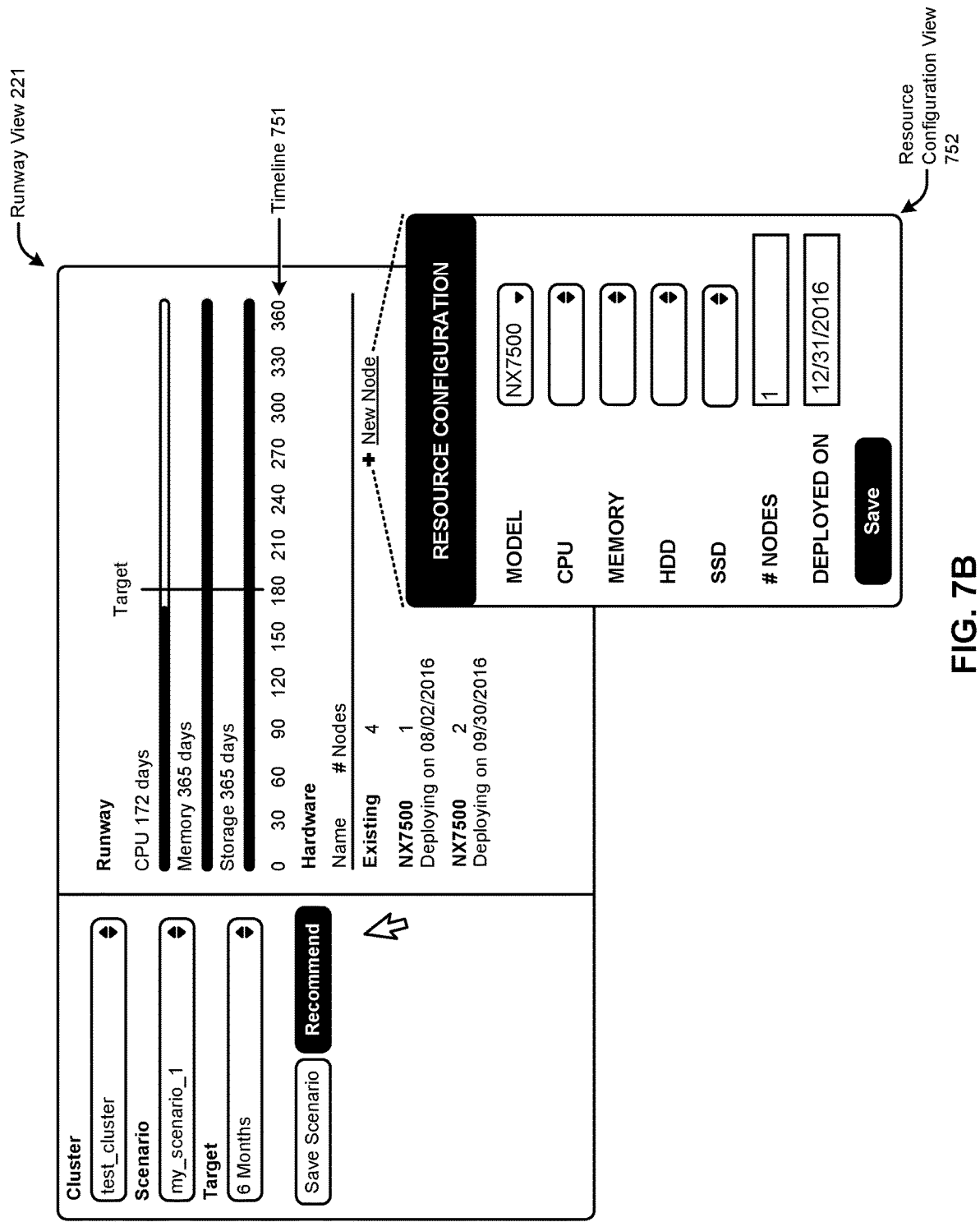

FIG. 7A and FIG. 7B illustrate management techniques for analyzing and controlling a plurality of clusters. As shown in FIG. 7A, the illustrated system includes a central management node 702 within a computing environment having multiple underlying systems/clusters (e.g., cluster $150_1$, cluster $150_2$). The multiple clusters are analyzed and controlled through cooperation between the central management node 702 and each of the separate local management nodes (e.g., local management node $701_1$, local management node $701_2$, local management node $701_3$).

Various embodiment of the method for forecasting distributed resource utilization in a virtualization environment may operate on or in conjunction with a virtualization management console, such as via a management console or on/within a cluster itself. Further, information for and about one or more clusters may be used as inputs to the training process such that the clusters can be used to perform predictions and runway calculations either for themselves, or in the alternative the clusters may receive inputs from the other clusters and perform predictions and runway calculations for the clusters such that the recommended actions can be provided based on the one or more clusters. For instance, in some embodiments the predictions for one cluster may determine that the cluster is over provisioned, and predictions for another cluster may determine that the other cluster is under provisioned, therein the recommendations might include migration of resources from one cluster to the other. In other examples, the recommendations may include swapping one node or component on one system with that of another, where the swapped nodes or components may increase one capability while decreasing another, such as when one cluster is processor bound and another cluster is storage bound and shifting components may rebalance both clusters advantageously. Furthermore, the individual clusters may execute their own prediction and runway analysis and the virtualization management console may control analysis of the results with respect to each console such that it determines any recommended movement of resources from one cluster to another cluster.

The environment includes one or more users at one or more user stations (e.g., the management console 223 connected to the central management node 702) so as to operate the virtualization system and/or management console 706. The user station 702 comprises any type of computing station that may be used to operate or interface with the system. Examples of such user stations include, for example, workstations, personal computers, or remote computing terminals. The user station 702 comprises a display device, such as a display monitor, for displaying a user interface to users at the user station. The user station 702 also comprises one or more input devices for the user to provide operational control over the activities of the system, such as a mouse or keyboard to manipulate a pointing object in a graphical user interface.

The system may host virtualization infrastructure comprising any processing components necessary to implement and provision any number of virtual machines. The virtualization infrastructure may include management components to obtain status for, configure, and/or control the operation of one or more storage controllers for accessing any forms of storage in a storage pool, possibly including node-local storage such as the shown datastores.

The management console 706 provides an interface that permits a user to manage and administer the operation of the system. According to some embodiments, the management console 706 comprises a Javascript program that is executed to display a management user interface within a web browser at the user station 702. In one embodiment, the storage controller exposes an API or GUI to create, read, update, delete (CRUD) datastores, which in turn can be managed by the central management console 706.

In operation in some embodiments, a web browser at the user station 702 is used to display a web-based user interface for the management console. The management console 706 might correspond to Javascript code used to implement any portions of the user interface, including management console 706. Metadata regarding the system is maintained at one or more datastores that collects data relating to the virtualization infrastructure. Any of the aforementioned gateways can be employed to obtain the metadata to be displayed in the user interface. In some embodiments, a gateway comprises a web server and servlet (e.g., implemented using Apache Tomcat).

Further details regarding methods and mechanisms for implementing virtualization management consoles U.S. patent application Ser. No. 15/006,416, entitled "ARCHITECTURE FOR IMPLEMENTING CENTRALIZED MANAGEMENT FOR A COMPUTING ENVIRONMENT", filed Jan. 26, 2016, and U.S. patent application Ser. No. 15/006,435, entitled "ARCHITECTURE FOR IMPLEMENTING USER INTERFACES FOR CENTRALIZED MANAGEMENT OF A COMPUTING ENVIRONMENT", filed Jan. 26, 2016. Control and interfacing with the system may reside on a central management node 702 that provides centralized access and control over any number of clusters. The centralized control architecture presented here includes a central management node 702 that comprises a management console 706, a gateway 7040, and a local datastore 7140. The central management node 702 interacts with other management nodes. In turn, each of these management nodes includes its own respective local management console (e.g., local management console 7121, local management console 7122, and local management console 7123), local data stores (e.g., datastore 7141, datastore 7142, and datastore 7143), and its own respective gateway (e.g., gateway 7041, gateway 7042, and gateway 7043).

Further details regarding methods and mechanisms for implementing virtualization management console are described in U.S. patent application Ser. No. 15/006,416, entitled "ARCHITECTURE FOR IMPLEMENTING CENTRALIZED MANAGEMENT FOR A COMPUTING ENVIRONMENT", filed Jan. 26, 2016, and U.S. patent application Ser. No. 15/006,435, entitled "ARCHITECTURE FOR IMPLEMENTING USER INTERFACES FOR CENTRALIZED MANAGEMENT OF A COMPUTING ENVIRONMENT", filed Jan. 26, 2016, which are hereby incorporated by reference in their entirety.

Still further, information for and about one or more clusters may be used as inputs to any system or subsystem for implementing seasonal time series analysis and forecasting using tournament selection. As such, one or more clusters can be used to perform predictions and runway calculations either for a cluster itself or another cluster, or all clusters may be analyzed as a whole or separately. In some cases a recommendation refers to sharing or migrating infrastructure from one node to another node. In some cases a recommendation refers to sharing or migrating infrastructure from one cluster to another cluster.

FIG. 7B depicts one embodiment of a screen device to present a runway view 221. As shown, the runway view plots several resources along a timeline 751. A time-oriented target (e.g., a date or a number of days into the future) is provided by a system administrator. The target is also plotted along the timeline. The amount of time that is available before predicted depletion is shown as a graphical indication over the timeline or "runway" pertaining to each individual resource. Recommendations are also shown. Strictly as an example, a recommendation might be expressed in the form of adding a new node. In turn, the configuration of a new node can be expressed as a model designation, or as a configuration of CPUs or as a configuration of memory, or as a configuration of HDD and/or SSD resources. In some cases, and as shown in resource configuration view 752, a deployment date can be displayed. If the recommendation is adopted (e.g., adding a "New Node") and the configuration is saved, then the effect of the addition of the configured resource can be reflected in the runway view 221 (e.g., as a longer runway into the future).

System Architecture

Figure 8A:
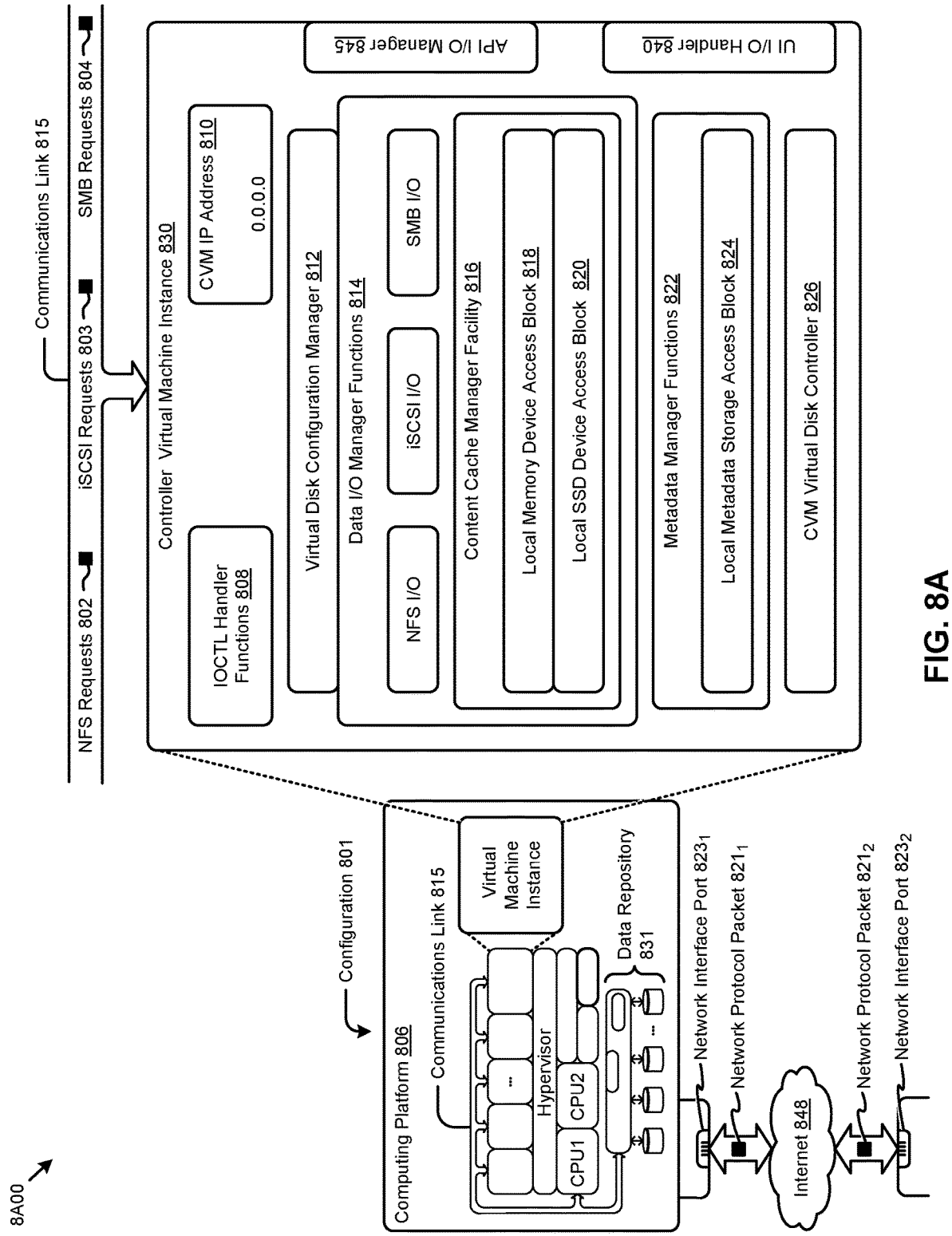
FIG. 8A and FIG. 8B depict virtualized controller architectures comprising collections of interconnected components suitable for implementing embodiments of the present disclosure and/or for use in the herein-described environments.

FIG. 8A depicts a virtualized controller architecture 8A00 comprising collections of interconnected components as implemented by the shown virtual machine architecture. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively so as to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-andwheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 8A00 comprises a collection of interconnected components suitable for implementing embodiments of the present disclosure and/or for use in the herein-described environments. Moreover, the shown virtual machine architecture 8A00 includes a virtual machine instance in a configuration 801 that is further described as pertaining to the controller virtual machine instance 830. A controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL functions 808) that interface to other functions such as data IO manager functions 814 and/or metadata manager functions 822. As shown, the data IO manager functions can include communication with a virtual disk configuration manager 812 and/or can include direct or indirect communication with any of various block IO functions (e.g., NFS IO, iSCSI IO, SMB IO, etc.).

In addition to block IO functions, the configuration 801 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

The communications link 815 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 830 includes a content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). An external data repository 831 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 824. The external data repository 831 can be configured using a CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2). According to certain embodiments of the disclosure, two or more instances of a configuration 801 can be coupled by a communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). The configuration 801 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

The computing platform 806 may transmit and receive messages that can be composed of configuration data, and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or results of executing program code can be delivered to a particular user via a download (e.g., a download from the computing platform 806 over the Internet 848 to an access device).

The configuration 801 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provision of power to the other units. In some cases, a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to the embodiments disclosed herein. In some embodiments, a module may include one or more state machines and/or combinational logic used to implement or facilitate the operational and/or performance characteristics pertaining to distributed resource prediction.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of distributed resource prediction). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to making distributed resource predictions, and/or for improving the way data is manipulated when performing computerized operations pertaining to distributed resource prediction.

Further details regarding general approaches to managing data repositories are described in U.S. Pat. No. 8,601,473 titled, "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled, "METHOD AND SYSTEM FOR IMPLEMENTING MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 8B:
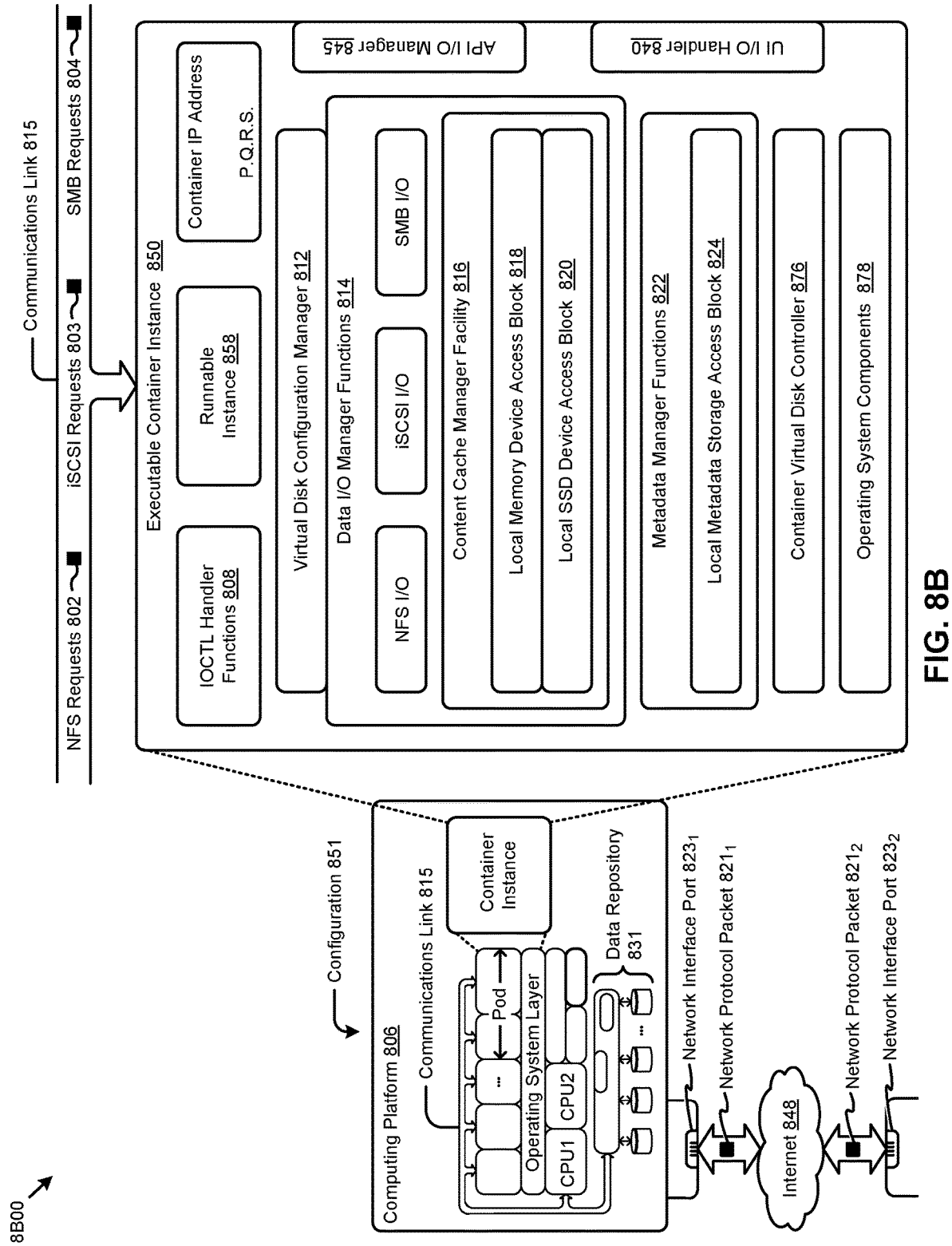

FIG. 8B depicts a virtualized controller implemented by a containerized architecture 8B00. The containerized architecture comprises a collection of interconnected components suitable for implementing embodiments of the present disclosure and/or for use in the herein-described environments. Moreover, the shown executable containerized architecture 8B00 includes an executable container instance in a configuration 851 that is further described as pertaining to the executable container instance 850. The configuration 851 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker executable container) can serve as an instance of an application executable container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include a runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, an executable container virtual disk controller 876. Such an executable container virtual disk controller can perform any of the functions that the aforementioned CVM virtual disk controller 826 can perform, yet such an executable container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method, comprising:
    storing, in a database associated with a virtualization environment, usage data for a plurality of users corresponding to respective nodes of a plurality of nodes in the virtualization environment, wherein the usage data corresponds to a distributed computer resource that comprises a storage pool, the usage data represents usage of storage of the storage pool by respective users of the plurality of users, and the storage pool is accessed through a plurality of virtualized controllers;
    determining computer resource demand for the distributed computer resource in the virtualization environment at least by:
        training a plurality of prediction models, wherein each individual prediction model of the plurality of prediction models is trained at least by processing a subset of the usage data stored in the database associated with the virtualization environment corresponding to a respective user of the plurality of users, multiple predictions models of the plurality of prediction models reflect seasonality of usage of the storage of the storage pool by multiple users of the plurality of users over time;
        generating a plurality of predictions using the plurality of trained prediction models, wherein individual predictions of the plurality of predictions correspond to respective individual users and represent predicted demand from the respective individual users, and the plurality of predictions reflect the seasonality of usage of the storage of the storage pool by the multiple users over time;
        aggregating the plurality of predictions into an aggregated prediction that represents aggregate predicted demand of the storage of the storage pool accessed through the plurality of virtualized controllers, and the aggregated prediction represents seasonally-adjusted usage of the storage of the storage pool by the plurality of users over time; and
        wherein the determined computer resource demand is based at least in part upon the aggregated predictions; and
    generating a graphical user interface having at least a representation of the determined computer resource demand.

2. The computer-implemented method of claim 1, wherein a first prediction of the plurality of predictions comprises a first time series of values, a second prediction of the plurality of predictions comprises a second time series of values, the aggregated prediction comprises a combination of the first time series and the second time series, and the method further comprises identifying when the distributed computer resource is predicted to be depleted at least by comparing the aggregated prediction to the distributed computer resource.

3. The computer-implemented method of claim 1, wherein virtualized controllers of the plurality of virtualized controllers are on individual nodes of a plurality of nodes in the virtualization environment, and the plurality of virtualized controllers present storage local to a corresponding node as part of the storage pool.

4. The computer-implemented method of claim 1, wherein the representation of the determined computer resource demand comprises a runway view representing when demand is predicted to meet a threshold corresponding to computer resource capacity.

5. The computer-implemented method of claim 4, wherein aggregating a first prediction and a second prediction of the plurality of predictions into the aggregated prediction comprises applying a respective weight to results from at least one of a first or second prediction model of the plurality of prediction models, the determined computer resource demand pertains to a storage container, the runway view includes a first resource runway and a second resource runway, the first resource runway is indicative of a first future timepoint or a first future temporal period when the distributed computer resource is predicted to be demanded to a threshold capacity of the distributed computer resource, and the second resource runway is indicative of a second future timepoint or a second future temporal period when the distributed computer resource is predicted to be demanded to a second threshold capacity of the distributed computer resource.

6. The computer-implemented method of claim 1, wherein the plurality of prediction models comprise at least one of an ARIMA (autoregressive integrated moving average) model, an ETS (exponential smooth) model, an STL (seasonal trend decomposition using Loess) model, a NEURAL NETWORK model, a RANDOM WALK model, a SEASONAL NAÏVE model, a MEAN model, or a LINEAR REGRESSION WITH SEASONAL COMPONENTS model, or a combination thereof.

7. The computer-implemented method of claim 1, wherein two or more nodes of the plurality of nodes generate the plurality of predictions.

8. The computer-implemented method of claim 7, wherein the determined computer resource demand pertains to a storage container that comprises an empty virtual disk, a virtual disk being populated with some actual data, a file or object, or a storage space for a virtual machine and the storage container comprises an area of storage in the storage pool that is managed by a controller virtual machine above a hypervisor executing on a node in the virtualization environment.

9. The computer-implemented method of claim 1, further comprises determining another aggregated prediction based on a system level prediction using a system level prediction model generated by processing aggregated usage data, wherein the aggregated usage data is generated by aggregating the usage data of the respective users for corresponding time periods, and wherein the virtualization environment comprises a first cluster, a second virtualization environment comprises a second cluster, and determining a second computer resource demand for a second distributed computer resource in the second virtualization environment.

10. A non-transitory computer readable medium having stored thereon a sequence of instructions which, when stored in memory and executed by a processor, causes the processor to perform a set of acts, the set of acts comprising:
storing, in a database associated with a virtualization environment, usage data for a plurality of users corresponding to respective nodes of a plurality of nodes in the virtualization environment, wherein the usage data corresponds to a distributed computer resource that comprises a storage pool, the usage data represents usage of storage of the storage pool by respective users of the plurality of users, and the storage pool is accessed through a plurality of virtualized controllers;
determining computer resource demand for the distributed computer resource in the virtualization environment at least by:
training a plurality of prediction models, wherein each individual prediction model of the plurality of prediction models is trained at least by processing a subset of the usage data stored in the database associated with the virtualization environment corresponding to a respective user of the plurality of users, multiple predictions models of the plurality of prediction models reflect seasonality of usage of the storage of the storage pool by multiple users of the plurality of users over time;
generating a plurality of predictions using the plurality of trained prediction models, wherein individual predictions of the plurality of predictions correspond to respective individual users and represent predicted demand from the respective individual users, and the plurality of predictions reflect the seasonality of usage of the storage of the storage pool by the multiple users over time;
aggregating the plurality of predictions into an aggregated prediction that represents aggregate predicted demand of the storage of the storage pool accessed through the plurality of virtualized controllers, and the aggregated prediction represents seasonally-adjusted usage of the storage of the storage pool by the plurality of users over time; and
wherein the determined computer resource demand is based at least in part upon the aggregated predictions; and
generating a graphical user interface having at least a representation of the determined computer resource demand.

11. The non-transitory computer readable medium of claim 10, wherein a first prediction of the plurality of predictions comprises a first time series of values, a second prediction of the plurality of predictions comprises a second time series of values, the aggregated prediction comprises a combination of the first time series and the second time series, and wherein the set of acts further comprise identifying when the distributed computer resource is predicted to be depleted at least by comparing the aggregated prediction to the distributed computer resource.

12. The non-transitory computer readable medium of claim 10, wherein virtualized controllers of the plurality of virtualized controllers are on individual nodes of a plurality of nodes in the virtualization environment, and the plurality of virtualized controllers present storage local to a corresponding node as part of the storage pool.

13. The non-transitory computer readable medium of claim 10, wherein the representation of the determined computer resource demand comprises a runway view representing when demand is predicted to meet a threshold corresponding to computer resource capacity.

14. The non-transitory computer readable medium of claim 13, wherein aggregating a first prediction and a second prediction of the plurality of predictions into the aggregated prediction comprises applying a respective weight to results from at least one of a first or second prediction model of the plurality of prediction models, the determined computer resource demand pertains to a storage container, the runway view includes a first resource runway and a second resource runway, the first resource runway is indicative of a first future timepoint or a first future temporal period when the distributed computer resource is predicted to be demanded to a threshold capacity of the distributed computer resource, and the second resource runway is indicative of a second future timepoint or a second future temporal period when the distributed computer resource is predicted to be demanded to a second threshold capacity of the distributed computer resource.

15. A computing system, comprising:
a processor; and
a storage medium having stored thereon a sequence of instructions which when executed by the processor, causes the processor to execute a set of acts, the set of acts comprising:
storing, in a database associated with a virtualization environment, usage data for a plurality of users corresponding to respective nodes of a plurality of nodes in the virtualization environment, wherein the usage data corresponds to a distributed computer resource that comprises a storage pool, the usage data represents usage of storage of the storage pool by respective users of the plurality of users, and the storage pool is accessed through a plurality of virtualized controllers;

determining computer resource demand for the distributed computer resource in the virtualization environment at least by:

training a plurality of prediction models, wherein each individual prediction model of the plurality of prediction models is trained at least by processing a subset of the usage data stored in the database associated with the virtualization environment corresponding to a respective user of the plurality of users, multiple predictions models of the plurality of prediction models reflect seasonality of usage of the storage of the storage pool by multiple users of the plurality of users over time;

generating a plurality of predictions using the plurality of trained prediction models, wherein individual predictions of the plurality of predictions correspond to respective individual users and represent predicted demand from the respective individual users, and the plurality of predictions reflect the seasonality of usage of the storage of the storage pool by the multiple users over time;

aggregating the plurality of predictions into an aggregated prediction that represents aggregate predicted demand of the storage of the storage pool accessed through the plurality of virtualized controllers, and the aggregated prediction represents seasonally-adjusted usage of the storage of the storage pool by the plurality of users over time; and wherein the determined computer resource demand is based at least in part upon the aggregated predictions; and generating a graphical user interface having at least a representation of the determined computer resource demand.

16. The computing system of claim 15, wherein a first prediction of the plurality of predictions comprises a first time series of values, a second prediction of the plurality of predictions comprises a second time series of values, the aggregated prediction comprises a combination of the first time series and the second time series, and wherein the set of acts further comprise identifying when the distributed computer resource is predicted to be depleted at least by comparing the aggregated prediction to the distributed computer resource.

17. The computing system of claim 15, wherein the determined computer resource demand pertains to a storage container that comprises an empty virtual disk, a virtual disk being populated with some actual data, a file or object, or a storage space for a virtual machine.

18. The computing system of claim 15, wherein the representation of the determined computer resource demand comprises a runway view representing when demand is predicted to meet a threshold corresponding to computer resource capacity.

19. The computing system of claim 18, wherein aggregating a first prediction and a second prediction of the plurality of predictions into the aggregated prediction comprises applying a respective weight to results from at least one of a first or second prediction model of the plurality of prediction models, the determined computer resource demand pertains to a storage container, the runway view includes a first resource runway and a second resource runway, the first resource runway is indicative of a first future timepoint or a first future temporal period when the distributed computer resource is predicted to be demanded to a threshold capacity of the distributed computer resource, and the second resource runway is indicative of a second future timepoint or a second future temporal period when the distributed computer resource is predicted to be demanded to a second threshold capacity of the distributed computer resource.

20. The computing system of claim 15, wherein the plurality of prediction models comprise at least one of an ARIMA (autoregressive integrated moving average) model, an ETS (exponential smooth) model, an STL (seasonal trend decomposition using Loess) model, a NEURAL NETWORK model, a RANDOM WALK model, a SEASONAL NAÏVE model, a MEAN model, or a LINEAR REGRESSION WITH SEASONAL COMPONENTS model, or a combination thereof.

21. The non-transitory computer readable medium of claim 10, wherein the plurality of prediction models comprise at least one of an ARIMA (autoregressive integrated moving average) model, an ETS (exponential smooth) model, an STL (seasonal trend decomposition using Loess) model, a NEURAL NETWORK model, a RANDOM WALK model, a SEASONAL NAÏVE model, a MEAN model, or a LINEAR REGRESSION WITH SEASONAL COMPONENTS model, or a combination thereof.

22. The non-transitory computer readable medium of claim 10, wherein two or more nodes of the plurality of nodes generate the plurality of predictions.

23. The non-transitory computer readable medium of claim 22, wherein the determined computer resource demand pertains to a storage container that comprises an empty virtual disk, a virtual disk being populated with some actual data, a file or object, or a storage space for a virtual machine and the storage container comprises an area of the storage in the storage pool that is managed by a controller virtual machine above a hypervisor executing on a node in the virtualization environment.

24. The non-transitory computer readable medium of claim 10, wherein the set of acts further comprise determining another aggregated prediction based on a system level prediction using a system level prediction model generated by processing aggregated usage data, wherein the aggregated usage data is generated by aggregating the usage data of the respective users for corresponding time periods, and wherein the virtualization environment comprises a first cluster, a second virtualization environment comprises a second cluster, and determining a second computer resource demand for a second distributed computer resource in the second virtualization environment.

* * * * *